(12) United States Patent
Fan et al.

(10) Patent No.: US 9,277,379 B2
(45) Date of Patent: *Mar. 1, 2016

(54) CONDITIONAL MESSAGE FORWARDING FUNCTIONS

(71) Applicant: AT&T Intellectual Property I, L.P., Atlanta, GA (US)

(72) Inventors: James Fan, San Ramon, CA (US); Thomas Barrett, San Ramon, CA (US); Jennifer K. Lam, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/157,272

(22) Filed: Jan. 16, 2014

(65) Prior Publication Data

US 2014/0171135 A1 Jun. 19, 2014

Related U.S. Application Data

(63) Continuation of application No. 12/889,953, filed on Sep. 24, 2010, now Pat. No. 8,676,155.

(51) Int. Cl.
*H04M 11/00* (2006.01)
*H04W 4/14* (2009.01)
*H04W 4/12* (2009.01)

(52) U.S. Cl.
CPC . *H04W 4/14* (2013.01); *H04W 4/12* (2013.01)

(58) Field of Classification Search
CPC ....... G06Q 10/10; G06Q 10/06; G06Q 30/04; G06Q 10/107; G06Q 30/0269; G06Q 20/28; H04L 12/58; H04L 12/14; H04L 67/306; H04L 51/14; H04W 4/24; H04W 4/12
See application file for complete search history.

(56) References Cited

U.S. PATENT DOCUMENTS

| 6,018,762 A | 1/2000 | Brunson et al. |
| 6,356,633 B1 | 3/2002 | Armstrong |

(Continued)

FOREIGN PATENT DOCUMENTS

WO 2008/146097 4/2008

OTHER PUBLICATIONS

Office Action dated Nov. 2, 2012 for U.S. Appl. No. 12/889,953, 64 pages.

(Continued)

*Primary Examiner* — Ronald Eisner
(74) *Attorney, Agent, or Firm* — Amin, Turocy & Watson, LLP

(57) ABSTRACT

Message forwarding by communication devices is conditionally and/or automatically controlled. A network message management component and/or handset message management component can monitor messages (e.g., short message service (SMS) messages) communicated between user equipment (UE) in a communication network, identify and/or intercept a message for which one or more forwarding conditions have been specified by the message originator, target, or forward target, and conditionally and/or automatically route the message to the target and/or forward target in accordance with predefined message routing rules based at least in part on the conditions specified by the originator, target, or forward target. The predefined message routing rules can be implemented by the network and/or the UEs, and can relate to the UE identifiers, time, priority, cost, operation state, size, desired automatic response messages, or other desired factors, associated with the message.

20 Claims, 11 Drawing Sheets

(56) References Cited

U.S. PATENT DOCUMENTS

| | | |
|---|---|---|
| 6,721,784 B1 | 4/2004 | Leonard et al. |
| 7,092,697 B1 | 8/2006 | Kupsh et al. |
| 8,023,973 B2 | 9/2011 | Wiatrowski et al. |
| 8,374,929 B1 | 2/2013 | Lappas et al. |
| 8,676,155 B2 * | 3/2014 | Fan et al. .................. 455/406 |
| 2003/0088629 A1 | 5/2003 | Berkowitz et al. |
| 2004/0210639 A1 | 10/2004 | Ben-Yoseph et al. |
| 2005/0215242 A1 | 9/2005 | Black et al. |
| 2006/0136560 A1 | 6/2006 | Jiang |
| 2006/0168204 A1 | 7/2006 | Appelman et al. |
| 2008/0162637 A1 * | 7/2008 | Adamczyk .......... H04L 12/5815 709/204 |
| 2010/0179995 A1 * | 7/2010 | Wang ........................ 709/206 |
| 2012/0077467 A1 * | 3/2012 | Fan et al. .................. 455/414.1 |
| 2013/0311630 A1 * | 11/2013 | Chastain ............ H04L 12/1407 709/223 |
| 2014/0171135 A1 * | 6/2014 | Fan et al. ..................... 455/466 |

OTHER PUBLICATIONS

Office Action dated Feb. 27, 2013 for U.S. Appl. No. 12/889,953, 68 pages.

Office Action dated Jun. 11, 2013 for U.S. Appl. No. 12/889,953, 107 pages.

* cited by examiner

CONDITIONAL MESSAGE FORWARDING FUNCTIONS

CROSS-REFERENCE TO RELATED APPLICATION

This application is a continuation of, and claims priority to, U.S. patent application Ser. No. 12/889,953, filed Sep. 24, 2010, and entitled "Conditional Message Forwarding Functions," the entirety of which is incorporated herein by reference.

TECHNICAL FIELD

The subject specification generally relates to wireless communications, and, more particularly, to implementing network-based and/or handset-based conditional message forwarding functions.

BACKGROUND

Mobile communication devices, such as cellular phones, have become prevalent in everyday life. The use of such devices for messaging (e.g., text messages (e.g., short message service (SMS), enhanced message service (EMS)), multimedia messages (e.g., multimedia messaging service (MMS)), instant messages, Session Initiation Protocol (SIP) messages, etc.) is ever increasing. Some users have unlimited messaging plans, whereby such users are allowed to send or receive an unlimited number of messages over a billing period for a specified fee. However, other users have limited messaging plans, whereby such users pay a certain fee for a specified number of messages per billing period and pay an additional fee per message for each message over the specified number of messages. Still other users have no messaging plan, whereby such users pay a specified fee for each message sent or received during the billing period.

Messaging using communication devices has increased in popularity in recent years. Sometimes, when a message (e.g., SMS message) is sent from an originating communication device to a target communication device, the target user associated with the target communication device can prefer that the message be forwarded to another communication device, which can be associated with the target user or another user for which the target user desires to forward the message. However, conventionally, the technologies for forwarding messages, such as SMS messages, remain relatively primitive, and most message forwarding functions are only implemented on the communication device and not in the network. One drawback with only employing message forwarding functions on the communication device is that such message forwarding functions do not work when the communication device is turned off.

One network-based SMS message forwarding technology uses a Home Location Registrar (HLR) proxy to intercept an SMS message to verify whether the message needs to be forwarded to another communication device. However, this network-based SMS message forwarding technology limits itself to an unconditional forwarding mode which means that if the target user elects to forward an SMS message to another communication device, the SMS message will be forwarded immediately, even if the originating user that sent the SMS message does not desire to have the message forwarded and/or the other user to which the message was forwarded does not desire to receive the message being forwarded. Such unconditional forwarding of SMS messages can result in potentially sensitive information in the SMS message being forwarded to another user, even if the originating user only desires the target user to be able to view the message and does not desire other persons, like the other user, to receive and view the message, and/or can result in the recipient of the forwarded message incurring the cost of receiving the forwarded message even if the recipient does not desire to receive the forwarded message. Accordingly, today, there is no way to desirably control forwarding of messages to communication devices.

The above-described deficiencies of today's messaging systems are merely intended to provide an overview of some of the problems of conventional systems, and are not intended to be exhaustive. Other problems with the state of the art and corresponding benefits of some of the various non-limiting embodiments may become further apparent upon review of the following detailed description.

BRIEF DESCRIPTION OF DRAWINGS

FIG. 4 illustrates a block diagram of an example mobile device in accordance with an embodiment of the disclosed subject matter.

DETAILED DESCRIPTION

Figure 1:
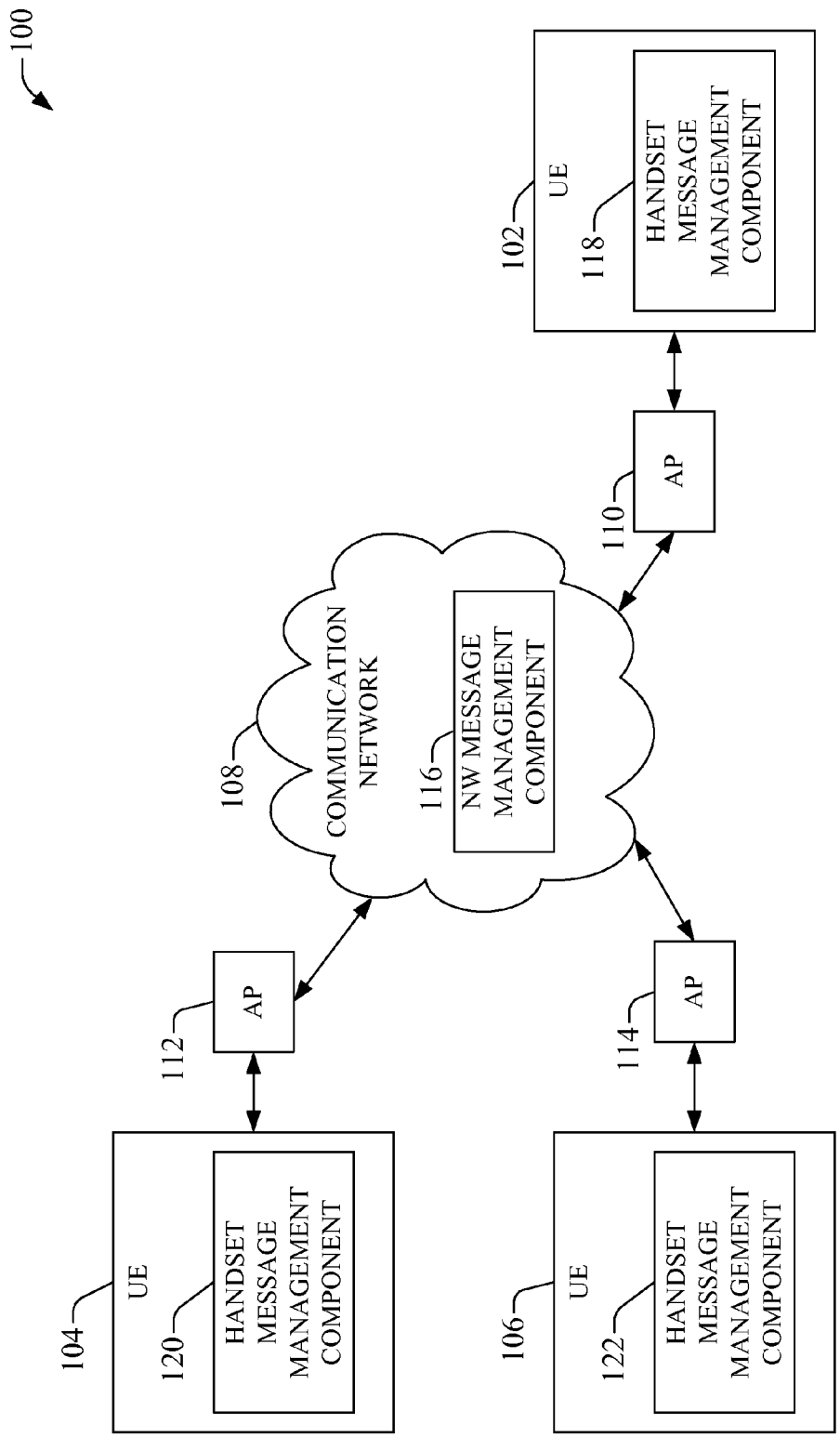
FIG. 1 is a block diagram of an example system that can conditionally forward messages in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Systems, methods, and devices that can conditionally control message forwarding by communication devices are presented. A network (NW) message management component and/or handset message management component(s) (e.g., local or user equipment (UE) message management component) can monitor messages (e.g., text messages (e.g., short message service (SMS), enhanced message service (EMS)), multimedia messages (e.g., multimedia messaging service (MMS)), instant messages, Session Initiation Protocol (SIP) messages, etc.) communicated between UEs (e.g., mobile communication devices, landline communication devices with text or mobile messaging capabilities, etc.) in a communication network, identify and/or intercept a message(s) for which one or more forwarding conditions have been specified by the sender (e.g., originating UE or associated originating UE user), intended recipient (e.g., target UE or associated target UE user), or forward recipient (e.g., forward target UE or associated forward target UE user to which the intended recipient desires to forward a message that is originally sent from the sender's UE to the intended recipient's UE), and route the message(s) to the intended recipient and/or intended forward recipient in accordance with predefined message routing rules (e.g., predefined message forwarding rules) and/or message forwarding indicators associated with a message(s), based at least in part on the conditions specified by the sender, intended recipient, or intended forward recipient. The predefined message forwarding rules can be implemented by the network and/or the UEs, and can relate to the UE identifiers, time a message is sent, priority of a message, message cost, UE operation state, size of a message, desired automatic response messages, or other desired factors, associated with the message.

The UE users can select desired message routing rules and other options using their respective UEs or other desired communication devices, wherein their respective message routing rules or other options selected by the respective UE users and/or other desired information can be stored in respective user profiles of the respective UE users. The user profiles can be stored in a data store associated with the NW message management component and/or respective user profiles can be stored in respective data stores associated with respective handset message management components in the respective UEs.

When a message is being sent from an originating UE to a target UE, and the target UE user has set a message routing rule requesting that messages (e.g., messages sent to the target UE from the originating UE) be forwarded to a forward target UE, the applicable message management component(s) (e.g., NW message management component(s) and/or a handset message management component(s)) can analyze the message (e.g., to identify the originating UE and target UE, identify whether there is a message-forwarding-allowance indicator and/or the value of such indicator, identify other characteristics of the message (e.g., size of the message, time of the message, whether the message includes an attachment, etc.)), user profiles of the originating UE user, target UE user, and/or forward target UE user, and/or other information. The applicable message management component can apply the applicable message routing rules and logic to the message to determine whether the message is to be forwarded to the forward target UE or not.

For instance, if a message routing rule is set for a target UE requesting that messages sent to the target UE from an originating UE(s) are to be forwarded to a forward target UE, the applicable message management component can apply that message routing rule, and if there is no other message routing rule(s) that supercedes that message routing rule, the applicable message management component can forward the message(s) from an originating UE(s) to the forward target UE. If a message routing rule(s) and/or message-forwarding-allowance indicator (e.g., set to prohibit forwarding) specified by an originating UE prohibits forwarding the message (e.g., forwarding the message to the forward target UE or a global restriction on message forwarding), and/or a message routing rule(s) specified by the forward target UE prohibits receiving the message (e.g., prohibits receiving a forwarded message(s), prohibits receiving a message(s) from the originating UE, and/or prohibits receiving a message(s) forwarded from the target UE, etc.), the applicable message management component (e.g., NW message management component) can apply the applicable rules and logic and can determine that the message is not to be forwarded to the forward target UE, even though the target UE (or associated target UE user) requested that the message be forwarded.

In accordance with other aspects, an applicable message management component(s) can be employed to enable a UE (or associated UE user) to conditionally generate and send (e.g., automatically generate and send) a desired automatic response message in response to a message received by the UE, in accordance with applicable message routing rules (e.g., as contained in user profiles of the originating UE user, target UE user and/or forward target UE user) and/or automatic-message-allowance indicator (e.g., if any such indicator is employed, or in accordance with the specified value of such indicator), wherein such indicator can be added to the message on a per-message basis or added to all messages, as desired by the UE user (e.g., originating UE user sending the message). When a message is sent from a sending UE to a recipient UE (e.g., sent from an originating UE to a target UE, sent from an originating UE to a target UE and/or a forward target UE (e.g., due to conditional message forwarding), or sent from or on behalf of a target UE to the forward target UE (e.g., due to conditional message forwarding)), if there is a message routing rule for the recipient UE (e.g., in the associated user profile) that requests to send an automatic response message to the sending UE, the applicable message management component can analyze the message (e.g., to identify a value of an automatic-response-allowance indicator) and/or user profile associated with the sending UE (e.g., to identify whether there is a message routing rule that prohibits automatic response messages being sent to or received by the sending UE), and applying the applicable message routing rules and logic, can determine whether the automatic response message can be sent (e.g., automatically) to the sending UE from the recipient UE. For example, if the user profile associated with the sending UE contains a message routing rule that prohibits the automatic response message from being sent to or received by the sending UE, and/or the message, which was sent by the sending UE to the recipient UE, includes an automatic-response-allowance indicator that is set to prohibit the automatic response message from being sent to or received by the sending UE, the applicable message management component determine that no automatic response message is to be sent to the sending UE from the recipient UE, even though the recipient UE desires to send an automatic response message.

In yet another aspect, the UE can access the applicable message management component(s) to facilitate using the UE to generate a desired preconfigured automatic response message (e.g., from a set of preconfigured automatic response messages stored in the data store) or a custom automatic response message. In still another aspect, the UE can employ the applicable message management component(s) to facilitate controlling the timing of sending of the automatic response message, so that the automatic response message can be sent at a desired time.

As used in this application, the terms "component," "system," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream, or, in an embodiment, a wired (e.g., landline) communication device that has mobile messaging functionality and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

2G Second Generation
3G Third Generation
3GPP Third Generation Partnership Project
4G Fourth Generation
AGPS Assisted GPS
AP Access Point
ADSL Asymmetric Digital Subscriber Line
AWS Advanced Wireless Services
BRAS Broadband Remote Access Server
BTA Basic Trading Area
CDMA Code Division Multiple Access
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Messaging using communication devices has increased in popularity in recent years. Sometimes, when a message (e.g., SMS message) is sent from an originating user equipment (UE) to a target UE, the target UE user associated with the target UE can or may prefer that the message be forwarded to another UE (which also can be referred to as a forward target UE), which can be associated with the target UE user or another UE user for which the target UE user desires to forward the message. However, conventionally, the technologies for forwarding messages, such as SMS messages, remain relatively primitive, and most message forwarding functions are only implemented on the UE and not in the network. One drawback with only employing message forwarding functions on the UE is that such message forwarding functions do not work when the UE is turned off.

Further, conventional network-based SMS message forwarding technology limits itself to an unconditional forwarding mode which means that if the target UE user elects to forward an SMS message to another UE, the SMS message will be forwarded immediately, even if the originating UE user that sent the SMS message does not desire to have the message forwarded and/or the other user (e.g., forward target UE user) to which the message was forwarded does not desire to receive the message being forwarded. Such unconditional forwarding of SMS messages can result in potentially sensitive information in the SMS message being forwarded to another UE user, even if the originating UE user only desires the target UE user to be able to view the message and does not desire other persons, like the other UE user, to receive and view the message, and/or can result in the recipient of the forwarded message incurring the cost of receiving the forwarded message even if the recipient does not desire to receive the forwarded message. Accordingly, today, there is no way to desirably control forwarding of messages to communication devices.

To that end, systems, methods, and devices that can conditionally and/or automatically control message forwarding by communication devices are presented. A network message management component and/or handset message management component can monitor messages (e.g., short message service (SMS) messages) communicated between UEs in a communication network, identify and/or intercept a message for which one or more forwarding conditions have been specified by the message originator, target, or forward target, and conditionally and/or automatically route the message to the target and/or forward target, and/or other desired destination (e.g., message box associated with the target, or message box associated with the forward target) in accordance with predefined message routing rules, which can be set in accordance with the conditions specified by the originator, target, or forward target, and/or other information (e.g., message-forwarding-allowance indicator). The predefined message routing rules can be implemented by the network (e.g., employing a network message management component) and/or the UEs (e.g., employing respective handset message management components), and can relate to, for example, the UE identifiers, time, priority, cost, operation state, size, desired automatic response messages, or other desired factors, associated with a message.

In another aspect, in response to a recipient UE receiving a message from a sending UE, an automated response message can be conditionally generated and sent (e.g., automatically generated and sent) from the recipient UE to the sending UE, in accordance with applicable message routing rules and logic, and/or other information (e.g., automatic-response-allowance indicator). In still another aspect, the automatic response message can be a preconfigured automatic response message or a custom generated automatic response message.

Referring to the drawings, FIG. 1 is a block diagram of an example system 100 that can conditionally forward messages (e.g., text messages (e.g., short message service (SMS), enhanced message service (EMS)), multimedia messages (e.g., multimedia messaging service (MMS)), instant messages, Session Initiation Protocol (SIP) messages, etc.) in accordance with various aspects and embodiments of the disclosed subject matter. Aspects and embodiments of the subject specification can be employed in wireless, wired and converged (e.g., wireless and wired) communication networks.

In an aspect, the system 100 can include a desired number of UEs (e.g., mobile and/or wireless communication device, such as a mobile phone (e.g., 3GPP UMTS phone), personal digital assistant (PDA), landline phone with mobile messaging functionality, computer, IP television (IPTV), gaming console, STB, multi-media recorder/player, video recorder/player, audio recorder/player, printer, etc.), such as UE 102, UE 104, and/or UE 106 in the communication network environment, wherein UE 102, UE 104, and/or UE 106 can be connected via a wireless communication connection or wireline communication connection to a communication network 108, for example. In an embodiment, for example, a UE (e.g., UE 106) also or alternatively can have a wireline communication connection with the communication network 108 and/or can be a wired or landline communication device (e.g., landline phone), which can have a wireline connection to the communication network 108 and have messaging functionality to send or receive messages, such as SMS, MMS, or other types of messages (e.g., other types of mobile messages), to or from other UEs associated with the communication network 108.

In an aspect, the UE 102 can be connected (e.g., wirelessly connected) to an AP 110 (e.g., macro AP, femto AP, pico AP, etc.) that can serve a specified coverage area to facilitate communication by the UE 102 and other UEs (e.g., UE 104, UE 106) in the wireless communication network environment. UE 104 can be connected (e.g., wirelessly connected) to an AP 112 (e.g., macro AP, femto AP, pico AP, etc.) that can serve a specified coverage area (e.g., a different coverage area than AP 110) to facilitate communication by the UE 104 and other UEs (e.g., UE 102, UE 106) in the wireless communication network environment. UE 106 can be connected (e.g., wirelessly connected) to an AP 114 (e.g., macro AP, femto AP, pico AP, etc.) that can serve a specified coverage area (e.g., a different coverage area than APs 110 and 112) to facilitate communication by the UE 106 and other UEs (e.g., UE 102, UE 104) in the wireless communication network environment. The APs 110, 112, and 114 can serve respective coverage cells (e.g., macrocells, femtocells, picocells, etc.) that can cover respective specified areas, and the APs 110, 112, and 114 can service mobile wireless devices, such as UE 102, UE 104, and UE 106, located in the respective areas covered by the respective cells, where such coverage can be achieved via a wireless link (e.g., uplink (UL), downlink (DL)). When an attachment attempt is successful, the UE 102 can be served by the AP 110, UE 104 can be served by AP 112, and UE 106 can be served by AP 114, and incoming voice and data traffic can be paged and routed to the UE 102 through the AP 110, to the UE 104 through the AP 112, to the UE 106 through the AP 114, respectively, and outgoing voice and data traffic from the UE 102, UE 104, and/or UE 106 can be paged and routed through the AP 110, AP 112, or AP 114, respectively, to other communication devices (e.g., another UE) in the communication network environment. In an aspect, UE 102, UE 104, and/or UE 106 can be connected and can communicate wirelessly using virtually any desired wireless technology, including, for example, cellular, Wi-Fi, Wi-Max, wireless local area networks (WLAN), etc.

In another aspect, the AP 110, AP 112, and AP 114 can be associated with (e.g., communicatively connected to) the communication network 108 (e.g., 2G, 3G, 4G, or xG network, where x can be virtually any desired integer or real value) that can facilitate wireless connection with the UEs 102, 104, and 106 connected to the respective AP 110, 112, and 114, and facilitate communication by the UE 102, UE 104, UE 106, and/or other UEs associated with the communication network 108 with other communication devices (e.g., wireless communication devices, wireline communication devices) in the communication network environment. The communication network 108 (e.g., a core network, or network comprising a core network) can facilitate routing voice and data communications between a communication device(s) (e.g., UE 102, UE 104, UE 106) and other communication devices (e.g., UE, landline phone, computer, email server, STB, multimedia server, audio server, video server, news server, financial or stock information server, other communication devices, etc.) associated with the core network 108 in the communication network environment. The communication network 108 also can allocate resources to the UEs in the communication network 108, convert or enforce protocols, establish and enforce Quality of Service (QoS) for the UEs, provide applications or services in the communication network 108, translate signals, and/or perform other desired functions to facilitate system interoperability and communication in the communication network 108 (e.g., wireless portion of the communication network 108 or wireline portion of the communication network 108). The communication network 108 further can include desired components, such as routers, nodes, switches, interfaces, controllers, etc., that can facilitate communication of data between communication devices in the communication network environment.

In accordance with various aspects and embodiments, the communication network 108 can comprise a network (NW) message management component 116 that can conditionally and/or automatically route messages (e.g., route message to an intended target UE and/or forward the message to a desired forward target UE(s)), in accordance with predefined routing criteria and corresponding predefined routing rules. In an aspect, one or more UEs (e.g., UE 102, UE 104, UE 106) associated with the communication network 108 can include respective handset message management components, such as handset message management component 118, handset message management component 120, and handset message management component 122, which can facilitate conditionally and/or automatically routing (e.g., forwarding) of messages on a local (e.g., handset) level and/or setting desired message routing parameters (e.g., to facilitate setting desired message routing rules) for the respective UEs on the network level (e.g., setting desired message routing parameters with the NW message management component 116) to facilitate intelligent and conditional routing of messages on a network level.

In an aspect, one or more desired message routing rules can be set in and implemented by the NW message management component 116 and/or a handset message management component (e.g., 118, 120, 122) to facilitate desired conditional message routing. The message routing rules can be specified by UE users, communication service providers, or other authorized entities. The message routing rules can relate to, for example, conditions specified by the UE user sending the message with regard to routing (e.g., automatic forwarding) of a message), conditions specified by the target UE user with regard to routing (e.g., automatic forwarding) of a message sent to the target UE user, conditions specified by a forward target UE user with regard to routing (e.g., receiving) of a message being forwarded from (or attempted to be forwarded from) the UE of the target UE user to the UE of the forward target UE user, conditions relating to desired time(s) for forwarding of messages (e.g., only automatically forward messages, which were originally sent to the target UE from an originating UE(s), to the forward target UE during a specified time period; from the forward target UE side, only receive forwarded messages during a desired time period), conditions relating to routing of a message based at least in part on priority of the message (e.g., only automatically forward a message, which was originally sent to a target UE from an originating UE, to a forward target UE when the message has a priority level that at least meets a predefined threshold priority level for forwarding; from the forward target UE side, only receive a forwarded message, which was originally sent to a target UE from an originating UE, when the message has a priority level that at least meets a predefined threshold priority level for receiving a forwarded message), conditions relating to UE identifiers (e.g., Mobile Subscriber Integrated Services Digital Network Numbers (MSISDNs) or other desired UE identifiers) for which message forwarding is desired (or undesired) (e.g., only automatically forward messages originating from a UE identifier included in a set of specified allowed UE identifiers; or automatically forward messages, except messages originating from a UE identifier included in a certain set of prohibited UE identifiers for which automatic forwarding is undesired; from the forward target UE side, only receive forwarded messages originating from a UE identifier included in a set of allowed UE identifiers), conditions relating to forwarding of messages based at least in part on a current operating state (e.g., on state, off state, communication connectivity state, etc.) of a target UE and/or forward target UE (e.g., automatically forward messages, which were originally sent to the target UE from an originating UE(s), to the forward target UE when the target UE is in an off state), conditions relating to the size of the message or whether there is an attachment with the message (e.g., only automatically forward messages, which were originally sent to the target UE from an originating UE(s), to the forward target UE when the particular message is smaller than a predefined threshold message size for forwarding or, alternatively or additionally, when the message does not include an attachment; from the forward target UE side, only receive forwarded messages when the message is smaller than a predefined threshold message size for receiving a forwarded message or, alternatively or additionally, when the message does not include an attachment), conditions relating to cost and/or whether the target user and/or forward target user has a subscription service for unlimited messaging, has a limited messaging plan or is paying for messages on a per message basis (e.g., only automatically forward up to a predefined number of messages per billing period; if the UE user is on a limited messaging plan, only allow automatic forwarding of messages until the messaging limit for the billing period is reached; from the forward target UE side, only receive up to a predefined number of forwarded messages per billing period, or, if the user of the forward target UE is on a limited messaging plan, only allow receiving of forwarded messages until the messaging limit for the billing period is reached; and/or a combination of the aforementioned cost-related conditions for a UE user that can or may forward messages to other UEs and receive forwarded messages from other UEs), and/or other desired message forwarding conditions.

As desired, during activation of a UE (e.g., 102), the message routing parameters can be set to a default setting on the network side (e.g., at the NW message management component 118) and/or the local (e.g., handset) side (e.g., at the handset message management component 120), or one or more message routing rules can be specified (e.g., by the UE user) and the message routing parameters can be set in accordance with the desired message routing rules (as desired, message routing parameters, which have not been modified in accordance with the desired message routing rules, can remain at default settings). The applicable message management component (e.g., NW message management component 118 or handset message management component of a UE) can be employed to modify message routing parameters for a UE, as desired, at virtually any desired time after activation as well.

In accordance with an aspect, respective user profiles can be generated and stored for respective UE users, wherein a user profile can comprise information, such as message routing rules (e.g., message forwarding rules, automatic response rules, etc.), message routing parameters, UE identifiers, and/or other information. A respective user profile can be stored in a data store associated with the NW message management component 116 and/or in a data store associated with a respective handset message management component (e.g., 118, 120, 122) of a respective UE (e.g., 102, 104, 106) of a respective UE user. When a message is being sent in the communication network 108, the NW message management component 116 and/or a handset message management component(s) (e.g., 118, 120, and/or 122), which is associated with a UE associated with the message (e.g., originating or sending UE, intended target UE, intended forward target UE), can access the respective user profile(s) (e.g., handset message management component can access the user profile of the UE user associated therewith) of the respective UE users to identify or determine a desired routing of the message, in accordance with all applicable message routing rules (e.g., applicable message routing rules associated with the originating UE 102, target UE 104, and/or forward target UE 106), information (e.g., message-forwarding-allowance indicator) contained in the message, applicable message forwarding logic, and/or other desired factors.

In an aspect, an originating UE 102 (which also can be referred to as source or sending UE) which is sending a message to a target UE 104 (which also can be referred to as a recipient UE), can place and implement desired conditions (e.g., using desired message routing rules) regarding whether the message being sent to the target UE 104 can be forwarded to forward target UE(s) 106 (which also can be referred to as forward recipient UE) specified by the target UE 104. The target UE 104 also can place and implement desired conditions (e.g., using desired message routing rules) regarding whether a message received from an originating UE 102 is to be forwarded to another UE(s). The forward target UE 106 (or intended forward target UE) also can place and implement desired conditions (e.g., using desired routing rules) regarding whether a message that is being forwarded (or is attempting to be forwarded) from the target UE 104 to the forward target UE 106 is to be forwarded to the forward target UE 106.

As one non-limiting example, an originating UE 102 can desire to send a message to a target UE 104, where the target user of the target UE 104 desires to have messages forwarded to a forward target UE 106 for a desired reason(s) (e.g., forward target UE 106 is the target user's personal UE, and the target UE 104 is the target user's work UE, and the target user desires to only carry one UE for a desired period of time). The message routing rules for the target UE 104 and the forward target UE 106 can be set to allow and/or request message forwarding such that messages sent to the target UE 104 can be forwarded to the forward target UE 106, wherein the message routing rules can be respectively stored in the respective user profiles associated with the target UE 104 and forward target UE 106. If the originating UE 102 has not placed a restriction (e.g., prohibition) on message forwarding (e.g., a message routing rule prohibiting forwarding, wherein a message-forwarding-allowance indicator can be included in the originating message and can be set to a defined message-forwarding-prohibited value indicating message forwarding is not allowed) for the message the originating UE 102 is sending to the target UE 104, when the message is sent from the originating UE 102 to the target UE 104, the NW message management component 116 can automatically detect and intercept the message, access the user profiles associated with the UEs 102, 104 and 106 and/or analyze information (e.g., message-forwarding-allowance indicator that is set to a defined message-forwarding-allowed value indicating the message can be forwarded, message-forwarding-allowance indicator that is set to a defined message-forwarding-prohibited value indicating the message is prohibited from being forwarded per the sender's specification) associated with the message, determine that the message is not prohibited by the originating UE 102 from being forwarded based at least in part on the parameter value of the message-forwarding-allowance indicator, determine that the target UE 104 desires the message to be forwarded to the forward target UE 106 based at least in part on the user profile associated with the target UE 104, determine that the forward target UE 106 is not prohibiting the message from being forwarded to the forward target UE 106 based at least in part on the user profile associated with the forward target UE 106, deliver the message to the target UE 104 (e.g., when desired by the target UE user in accordance with the user profile of the target UE user), and deliver a copy of the message to the forward target UE 106, wherein the NW management component 116 can replace the recipient address of the message to send the message copy to the address (e.g., UE identifier) associated with the forward target UE. In an aspect, the message delivered to the forward target UE 106 can indicate the originator of the message (e.g., UE identifier associated with the originating UE 102 and/or associated UE user) and/or the target UE 104 (e.g., UE identifier associated with the target UE 104 and/or associated target UE user) that is forwarding the message to the forward target UE 106, in accordance with applicable message routing rules and the user profile associated with the forward target UE 106.

In an aspect, if the originating UE 102 has placed a restriction on message forwarding (e.g., with specific regard to that message (e.g., per message basis) or in accordance with a message forwarding restriction contained in the user profile, wherein a message-forwarding-allowance indicator that is set to a defined message-forwarding-prohibited value can be inserted into the originating message to facilitate implementing a message routing rule prohibiting forwarding of the message) for the message the originating UE 102 is sending to the target UE 104, if the target UE 104 has not specified that the message is to be forwarded, and/or if the forward target UE 106 has placed a restriction on receiving the forwarded message (e.g., a message routing rule prohibiting forwarding the message to the forward target UE), when the message is sent from the originating UE to the target UE, the NW message management component 116 can automatically detect and intercept the message, access the user profiles associated with the UEs 102, 104 and 106 and/or analyze information (e.g., message-forwarding-allowance indicator). The NW message management component 116 also can automatically determine that the message is prohibited by the originating UE 102 from being forwarded (e.g., based at least in part on the message-forwarding-allowance indicator, if it is set to message-forwarding-prohibited value), determine that the target UE 104 does not desire the message to be forwarded to the forward target UE 106 (e.g., based at least in part on the user profile associated with the target UE 104, if the user profile specifies that message forwarding is not desired or requested), and/or determine that the forward target UE 106 is prohibiting the message from being forwarded to the forward target UE 106 (e.g., based at least in part on the user profile associated with the forward target UE 106, if that user profile indicates that the forward target UE 106 does not desire to receive the forwarded message), in accordance with the message routing rules based at least in part on the information contained in the respective user profiles and/or information associated with the message. The NW message component 116 can accordingly automatically determine that the message is not to be forwarded to the forward target UE 106, and can automatically deliver a copy of the message to the target UE 104, which can be stored in a message box, but not deliver a copy of the message to the forward target UE 106. In an aspect, in the instance where the target UE has not requested to forward the message, the NW message management component 116 can recognize such condition, and can determine that the message is not to be forwarded, and thus, does not have to further analyze other information, such as the user profiles associated with the originating UE 102 or forward target UE 106.

As further example, additionally, or alternatively, the respective handset message management components 118, 120, and 122 of the respective UEs 102, 104, and 106 (e.g., originating UE, target UE, forward target UE) can control routing of the message in accordance with applicable message routing rules (e.g., rules as specified by the respective UE users as contained in the respective user profiles and/or as specified with regard to the message on a per message basis). An originating UE 102 can desire to send a message to a target UE 104, where the target user of the target UE 104 desires to have messages forwarded to a forward target UE 106 for a desired reason(s), the originating UE 102 has not placed a restriction to forwarding the message, and the forward target UE 106 is set to allow the forwarded message to be received by the forward target UE 106, in accordance with the respective applicable routing rules. When the message is sent from the originating UE 102 to the target UE 104, the message management component 120 of the target UE 104 can receive the message, and can automatically access the user profile associated with the target UE 104, analyze information associated with the message (e.g., message-forwarding-allowance indicator included with the message indicating the message can be forwarded) and the user profile associated with the target UE 104, and determine the message is not prohibited by the originating UE 102 from being forwarded and determine the target UE 104 desires the message to be forwarded to the forward target UE 106, store the message in a data store associated with the target UE 104, and generate and deliver a copy of the message to the forward target UE 106, wherein the copy of the message can replace the recipient address with the UE identifier associated with the forward target UE 106. The handset message management component 122 of the forward target UE 106 can automatically detect the forwarded message, identify that the message is a forwarded message (e.g., based at least in part on a forwarding indicator associated with the message that is set to a value to indicate that the message is a forwarded message), access the user profile associated with the forward target UE 106, determine that the forward target UE 106 is not prohibiting the message from being forwarded to the forward target UE 106 based at least in part on the user profile associated with the forward target UE 106, and present the message to the forward target UE 106 and/or generate and present an alert signal (e.g., an alert message and/or or visual, audio, or other sensory signal) to alert the user of the forward target UE 106 of the forwarded message. Additionally, or alternatively, if the user of the forward target UE 106 desires to decide whether to accept a forwarded message on a per message basis, the handset message management component 122 can present the alert signal to the user, can prompt the user to indicate whether the user desires to accept the forwarded message, and can present the forwarded message or not based at least in part on a received indication from the user.

In an aspect, the message delivered to the forward target UE 106 can indicate the originator of the message (e.g., identifier associated with originating UE 102 and/or associated user) and/or the target UE 104 (e.g., identifier associated with the target UE 104 and/or associated user) that is forwarding the message to the forward target UE 106, in accordance with applicable message routing rules (e.g., as specified in the user profile associated with the forward target UE 106). For instance, the user of the UE 106 can be provided an option (e.g., in a menu) to request that the forwarded message display the identifier of the originating UE 102 and/or identifier associated with the target UE 104. In another aspect, the user of the forward target UE 106 can be presented with and, if desired, can select an option (e.g., in a menu) a messaging box option, wherein, when selected, messages forwarded from the target UE 104 can be placed in a messaging box, which can be accessed by the user of the forward target UE 106 when desired. The handset message management component 122 can generate and present an alert signal to the user of the UE 106 indicating that a forwarded message has been received, identifying the originating UE and/or associated user, identifying the target UE and/or associated user forwarding the message, identifying the number of forwarded messages, identifying the time(s) of the forwarded message(s), and/or other presenting other desired information. In another aspect, the user of UE 106 can access the message box and perform desired functions (e.g., can search, sort, or execute other desired analytical management features) on the forwarded messages therein to selectively read the forwarded messages.

If it is desired to place a restriction on automatic message forwarding (e.g., a routing rule prohibiting forwarding) for the message the originating UE 102 is sending to the target UE 104, when the message is being generated to be sent from the originating UE 102 to the target UE 104, in response to a received user command to restrict automatic message forwarding (e.g., forwarding restriction command based at least in part on a previous forwarding restriction setting made by the user, or a per-message or one-time forwarding restriction command specifically relating to the message being sent), the handset message management component 118 of the originator UE (e.g., 102) can insert a message-forwarding-allowance indicator having a defined message-forwarding-prohibited value in the message (e.g., as metadata) to indicate that the message is not allowed to be forwarded (e.g., automatically forwarded) by the target UE 104 to a forward target UE 106. The target UE 104 can receive the message and the handset message management component 120 can detect and identify the message-forwarding-allowance indicator restricting forwarding the message. The handset message management component 120 can determine that the message is not to be automatically forwarded based at least in part on the message-forwarding-allowance indicator and applicable message routing rules and logic, and the message will not be automatically forwarded to a forward target UE 106, even if the target UE 104 is set to automatically forward the received message to the forward target UE 106.

If the user of the forward target UE 106 desires to prohibit receiving forwarded messages, that user can input information to the forward target UE 106 (or another communication device that can be used to access and modify the user profile associated with the forward target UE 106) indicating that forwarded messages are not to be received by and/or presented on the forward target UE 106, and the handset message management component 122 can receive that input information and the message routing parameter(s) can be set to prohibit or restrict receiving and/or presenting messages on the forward target UE 106. If the forward target UE 106 has placed a restriction on receiving the forwarded message (e.g., a routing rule prohibiting forwarding the message to the forward target UE 106, wherein the routing rule can be stored in the user profile associated with the forward target UE 106), but the target UE 104 is set to automatically forward a received message to the forward target UE 106 (and the originating UE 102 has not restricted forwarding of the message), when the message is sent from the originating UE 102 to the target UE 104, the handset message management component 120 of the target UE 104 can determine that the received message is to be forwarded to the forward target UE 106, based at least in part on the user profile associated with the target UE 104, and can insert a forwarding indicator in a copy of the message (e.g., as metadata) to indicate that the message is a forwarded message as well as replace the recipient address with the UE identifier associated with the forward target UE 106, and can send a copy of the message to the forward target UE 106.

However, since the forward target UE 106 is restricting receiving or presenting forwarded messages, the handset message management component 122 of the forward target UE 106 can analyze the message and identify the message as a forwarded message based at least in part on the forwarding indicator in the message, can determine that forwarded messages are not to be received by or presented on the forward target UE 106 based at least in part on the user profile associated with the forwarding target UE 106 (e.g., comprising the message routing parameter(s) providing that forwarded messages are not to be received or presented), and can refuse or discard the forwarded message without presenting the forwarded message on the forward target UE. Additionally, or alternatively, if the user of the forward target UE 106 desires to decide whether to accept a forwarded message on a per message basis, the handset message management component 122 can present a message alert signal (e.g., forwarded message alert signal) to the user, can prompt the user to indicate whether the user desires to accept the forwarded message, and can present the forwarded message or not based at least in part on a received indication (e.g., indication to accept the forwarded message, indication declining to accept the forwarded message) from the forward target UE user. In an aspect, the forwarded message can be pre-screened by the handset message management component 122, wherein the handset message management component 122 can evaluate information associated with the forwarded message, such as the identifier of the originating UE 102, the identifier of the target UE 104, and/or the forwarding indicator, to facilitate classifying the forwarded message as a forwarded message and/or who originally sent and/or forwarded the message, and/or determining whether the applicable message routing rules permit forwarding the forwarded message to the forward target UE 106.

In accordance with another aspect, when desired, an automatic response message can be automatically generated and sent by a target UE (e.g., or forward target UE) to the originating UE (or the target UE that forwarded a message) in response to receiving a message from the originating UE (or the target UE that forwarded a message). For example, an automatic response message can be generated and sent when the message recipient or associated UE is not ready to or is unable to receive messages or cannot respond to messages. The automatic response feature can be set by the UE user by selecting the automatic response feature in a menu. The automatic response feature can be implemented at the network level by the NW message management component 116 and/or at the handset level by a handset message management component (e.g., 118, 120, 122) of a UE (e.g., 102, 104, 106). The automatic response message can be a preconfigured automatic response message (e.g., "I'm in a meeting, but will read and/or respond to your message when I get the chance", "I am unavailable to read and/or respond to your message right now, but will read and/or respond when I get the chance", etc.), wherein the preconfigured automatic response messages can be stored in a data store, and/or the automatic response message can be a custom generated automatic response message that can be created and edited by the UE user using the UE (or another communication device, such as a home computer) and stored in a data store. The UE user can use the UE (or other communication device) to modify (e.g., change) an automatic response message, and can edit, update, or delete a custom generated automatic response message.

In still another aspect, for a UE receiving a message(s), the automatic response message(s) can be automatically sent to any or all UEs that send a message to the receiving UE, or to a specified UE(s) (e.g., one or more UEs associated with one or more UE identifiers that are contained in a list of UEs to which automatic response messages can be sent). In yet another aspect, as desired, there can be different automatic response messages that can be sent to different UEs from the receiving UE, wherein the UE user can provide information indicating the particular automatic response message to send to a particular UE, and the NW message management component 116 and/or a handset message management component (e.g., 118, 120, 122) can control sending a desired automatic response message to the desired UE.

In another aspect, the NW message management component 116 or a handset message management component (e.g., 118, 120, 122) can control sending of a desired message(s) to a desired UE(s) at a future time. For instance, the UE user can create a message, and can provide information regarding the time the UE user desires for the message to be sent and the UE(s) to which the message is to be sent to the NW message management component 116 or handset message management component (e.g., 118, 120, 122). The NW message management component 116 or handset message management component (e.g., 118, 120, 122) can store the message and at the desired future time, can automatically send the message to the desired UE(s).

In still another aspect, the automatic response feature can be leveraged by a UE (e.g., 102, 104, 106) to automatically send a desired predefined message back to a certain communication device(s) associated with a certain communication device identifier(s) (e.g., MSISDN(s)) upon receipt of a message from the certain communication device(s). This feature can be useful, for example, to automatically send a response message that is a vote in relation to a television show or other event without having to be available to manually send the message.

In yet another aspect, when a UE (e.g., 104) initiates network-based message forwarding or when the UE initiates handset-based message forwarding but is powered off, the NW message management component 116 can verify whether the messaging mail box option for the UE is selected (e.g., checked). If the messaging mail box option has been selected, when a message is sent to the UE, a copy of the forwarded message can be delivered to a dedicated messaging box of the UE. This can allow the user of the UE to search, sort, or execute other analytical management functions to selectively read messages in the dedicated messaging box (e.g., a regular messaging box or email box, or a specially configured message box) at a later time (e.g., when the UE is powered on again).

In an aspect, since there may be some UE users who do not desire to receive automatic response messages in response to their sent messages (e.g., due to the UE user not having an unlimited messaging plan), the originating message sent from the originating UE 102 to the target UE 104 can be enhanced to include a per-message-automatic-response-allowance indicator that can indicate whether the originating UE 102 will accept an automatic response message in response to the originating message. The originating user associated with the originating UE can opt in or opt out regarding whether an automatic response message is allowed to be delivered to the originating UE 102 from the target UE 104, wherein the decision to opt in or opt out can be made on a per message basis or can be applied for all messages sent from the originating UE 102.

The subject specification has a number of advantages over conventional communication systems, methods, and devices. For instance, the subject specification, by conditionally forwarding message to a forward UE, when the message is sent from a source UE to a target UE, in accordance with predefined routing criteria, can enable communication service providers (e.g., wireless service providers) to offer differentiated and/or enhanced message forwarding features (e.g., SMS or MMS forwarding features), wherein such benefit can result in improved service opportunity, increased revenue generation, and increased customer satisfaction, over conventional systems and methods; can offer improved comprehensive integrated network-based and/or handset-based message forwarding features, wherein such benefit can result in improved product flexibility to meet different customer needs or desires, over conventional systems and methods; can offer improved message forwarding privacy features, wherein such benefit can enable provision of enhanced differentiated services and increased customer satisfaction, over conventional systems and methods; can allow trace back of a forwarded message's life cycle, which can result in improved differentiated services over conventional systems and methods; can provide an audit trail for service providers to support billing (e.g., can bill by per forwarding message or money subscription), which can result in improved revenue generation, over conventional systems and methods; and can allow the subscriber to have greater control over the destination of a message by prohibiting the message from being forwarded when the predefined message routing rules so specify, which can result in enhanced differentiated services and improved information security for subscribers, over conventional systems and methods.

Figure 2:
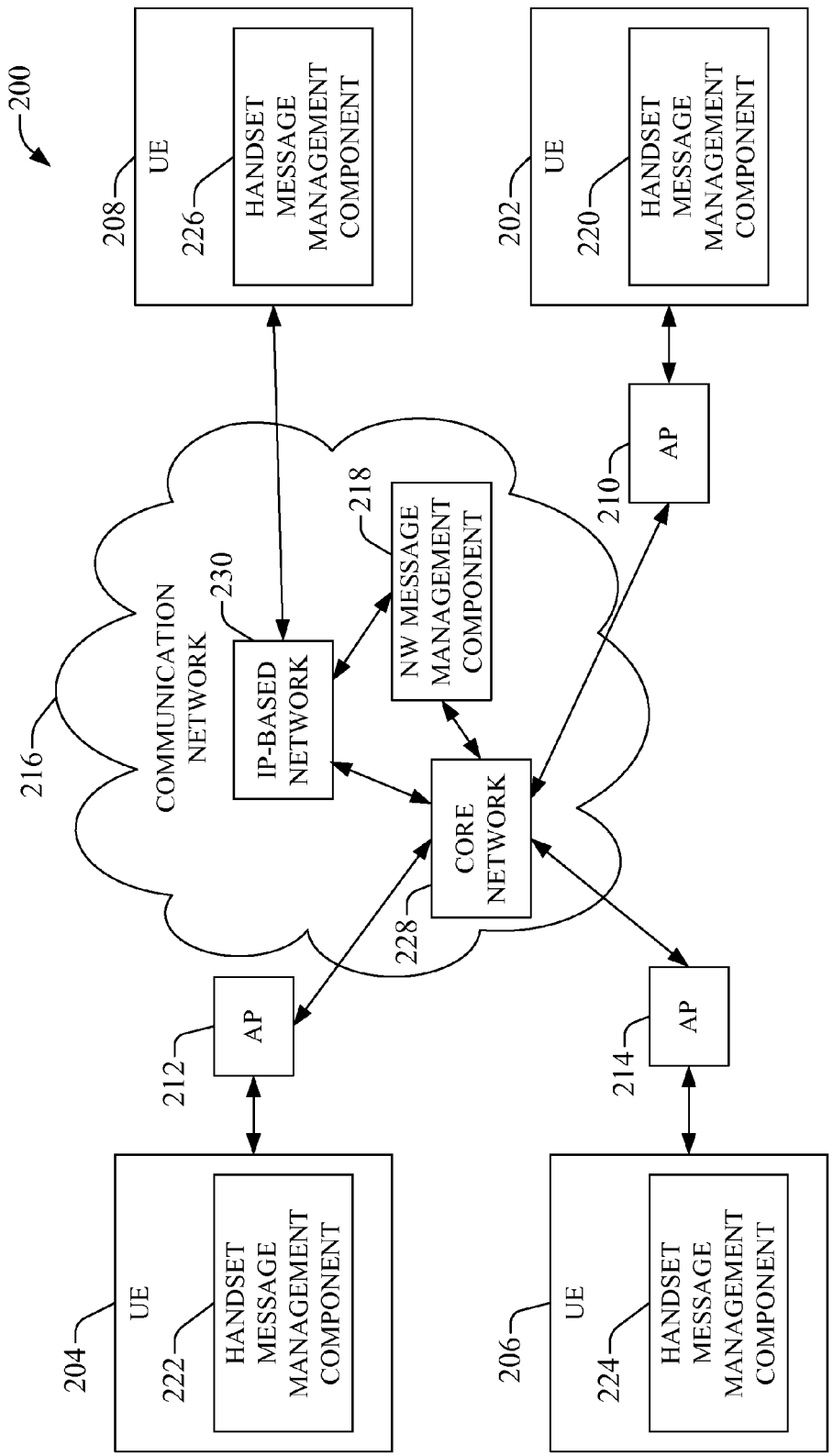
FIG. 2 depicts a block diagram of an example system that can conditionally forward messages in accordance with aspects and embodiments of the disclosed subject matter.

FIG. 2 depicts a block diagram of an example system 200 that can conditionally forward messages in accordance with aspects and embodiments of the disclosed subject matter. The system 200 can include a desired number of UEs, including UE 202, UE 204, UE 206, and/or UE 208, a desired number of APs, including AP 210, AP 212, and/or AP 214, a communication network 216. The communication network 216 can include a NW message management component 218, and the UEs (e.g., 202, 204, 206, 208) can comprise respective handset message management components, such as respective handset message management components 220, 222, 224, and/or 226. The UEs (e.g., 202, 204, 206, 208), APs (e.g., 210, 212, 214), communication network 216, NW message management component 218, and handset message management components (e.g., 220, 222, 224, 226) each can respectively be the same or similar as, and/or comprise the same or similar functionality as, respective components (e.g., respectively named components), such as more fully described herein.

In an aspect, the communication network 216 can include a core network 228 (e.g., mobile core network) that can facilitate communications by UEs wirelessly connected to the communication network 216. The UEs 202, 204, and 206 can be communicatively connected to the core network 228 via the respective APs 210, 212, and 214. The core network 228 can facilitate wireless communication of voice and data associated with communication devices, such as UEs 202, 204, and 206, in the communication network 216. The core network 228 can facilitate routing voice and data communications between UEs and/or other communication devices (e.g., phone, computer, email server, multimedia server, audio server, video server, news server, financial or stock information server, other communication devices associated with an IP-based network (e.g., the Internet), etc.) associated with the communication network 216. The core network 228 also can allocate resources to the UEs (e.g., 202, 204, 206) in the network 216, convert or enforce protocols, establish and enforce Quality of Service (QoS) for the UEs, provide applications or services in the network, translate signals, and/or perform other desired functions to facilitate system interoperability and communication in the wireless communication network. The core network 228 further can include desired components, such as routers, nodes (e.g., SGSN, GGSN, etc.), switches, interfaces, controllers, etc., that can facilitate communication of data between communication devices associated with the communication network 216.

In yet another aspect, the communication network 216 can include an IP-based network 230 that can facilitate communications by UEs that are connected to the communication network 216 via a wired line or landline connection, or a wireless connection. For instance, the UE 208 can be communicatively connected to the IP-based network 230 via a wired line or landline, wherein the UE 208 can communicate with other UEs (e.g., 202, 204, 206) connected to the communication network 216.

In an aspect, a wired communication connection between the UE 208 and the IP-based network 230 can be a communication connection that can communicate voice or data, and/or can be a DSL-type or broadband connection facilitated via an Ethernet connection, and/or a wireless communication connection can be facilitated via a connection of the UE 208 to an AP (not shown). The UE 208 can transmit messages via a wired or wireless connection through the IP-based network 230, or other communication network (not shown), and/or the core network 228 to other UEs, or by accessing the user account associated with the UE 208 on the service provider's web site via a wired or wireless communication connection, wherein the web site can allow the UE user to use a UE 208 to send messages (e.g., SMS, MMS, etc.) from the originating address or identifier (e.g., MSISDN) associated with the UE 208 via the IP-based network 230 to other UEs associated with the communication network 216.

In accordance with various aspects, as desired, a message can be sent from an originating UE to a target UE, and can be automatically and/or conditionally forwarded to a forward target UE and/or an automatic response message can be sent (e.g., automatically sent) in response to the message, in accordance with one or more predefined message routing rules (e.g., including message routing rules provided in respective user profiles associated with respective UEs) and/or one or more indicators (e.g., message-forwarding-allowance indicator, forwarding indicator, automatic-response-allowance indicator, etc.), as more fully described herein. As desired, for respective messages, any one of the UEs 202, 204, 206, and 208 can be the originating UE, and other of the UEs can be the target UE(s) or the forward target UE(s). The NW message management component 218 and/or respective handset message management components 222, 224, 226, and/or 228 of the respective UEs 202, 204, 206, and/or 208 can facilitate controlling messaging (e.g., conditional automatic forwarding of messages, conditional sending of automatic response messages) associated with the UEs associated with the communication network 216.

Figure 3:
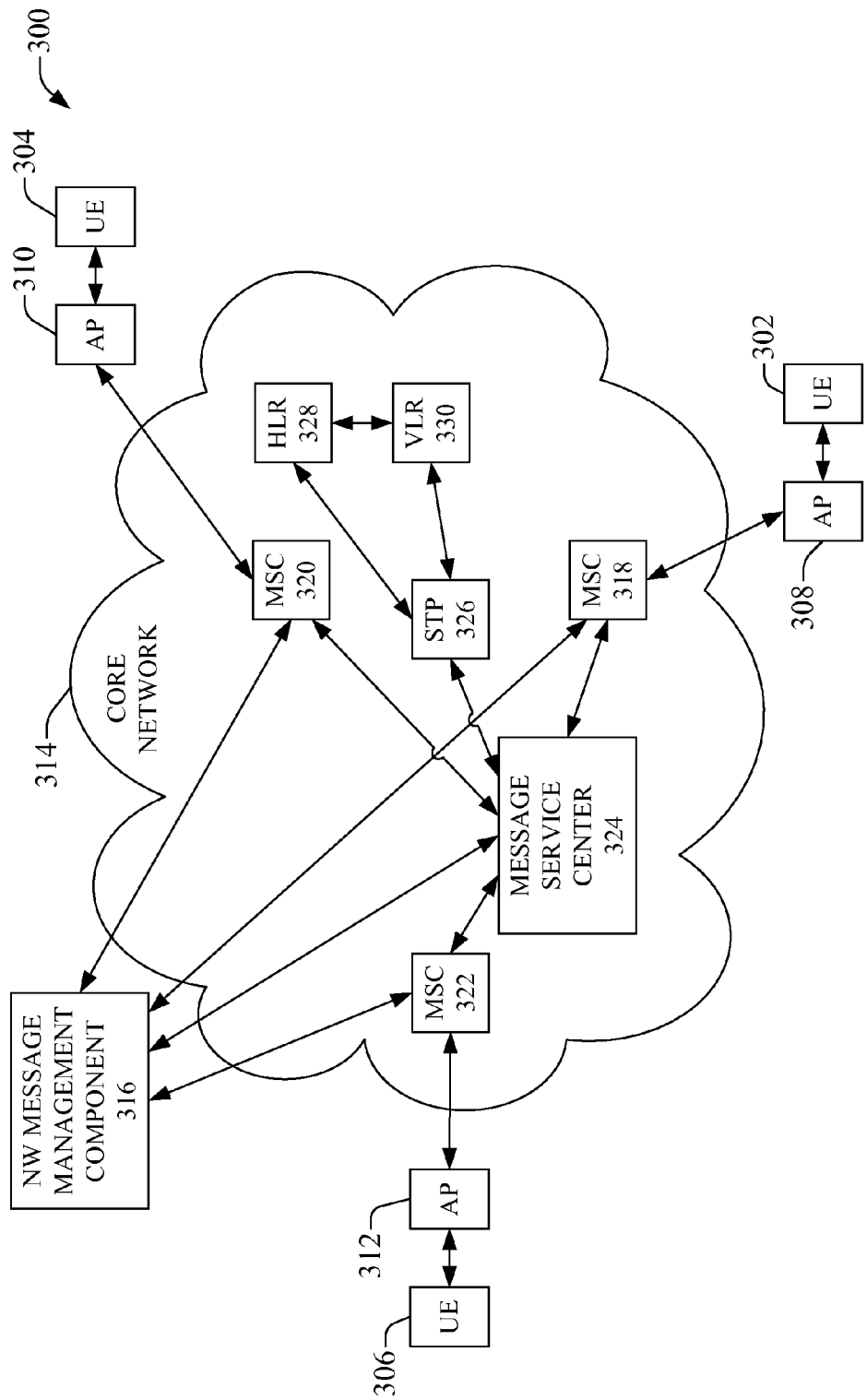
FIG. 3 illustrates a block diagram of another example system that can conditionally forward messages in accordance with aspects and embodiments of the disclosed subject matter.

FIG. 3 illustrates a block diagram of an example system 300 and communication flow relating to conditional message forwarding in accordance with various aspects and embodiments of the disclosed subject matter. The system 300 can include a desired number of UEs, including UE 302, UE 304, UE 306, a desired number of APs, including AP 308, AP 310, and/or AP 312, and a core network 314. The core network 314 can be associated with a NW message management component 316. The UEs (e.g., 302, 304, 306), APs (e.g., 308, 310, 312), core network 314, and NW message management component 316, each can respectively be the same or similar as, and/or comprise the same or similar functionality as, respective components (e.g., respectively named components), such as more fully described herein.

In accordance with various aspects, the core network can comprise a desired number of mobile switching centers (MSCs), including MSC 318, MSC 320, and MSC 322, that can be nodes (e.g., service delivery nodes) that can facilitate routing voice calls and messages (e.g., SMS, MMS, etc.) in the core network 314. The core network 314 also can contain a message service center 324 (e.g., short message service center (SMSC)) that can facilitate routing and delivery of messages between UEs associated with the core network 314.

In other aspects, the core network 314 can include a signaling transfer point (STP) 326 that can be associated with the message service center 324, and can be a router that can facilitate routing traffic (e.g., route traffic on the an IP-based network, such as the Internet), address translation, and other desired functions, in the core network 314. The core network 314 also can include a home location register (HLR) 328 that can be associated with the STP 326 and can comprise a database that includes information relating to UE users associated with the core network 314. The HLR 328 can include information relating to SIM cards and MSISDNs, for example. The core network 314 can contain a visitor location register (VLR) 330 that can be associated with the HLR 328 and can include a database that stores information regarding UEs that are associated with MSCs with which the VLR 330 is associated. In an aspect, an MSC can send information regarding a new UE located in or associated with the core network 314 and a new record can be generated for the new UE and stored in the database in the VLR 330, and the HLR 328 can be updated with regard to the new UE (e.g., location of the new UE can be identified).

Figure 4:
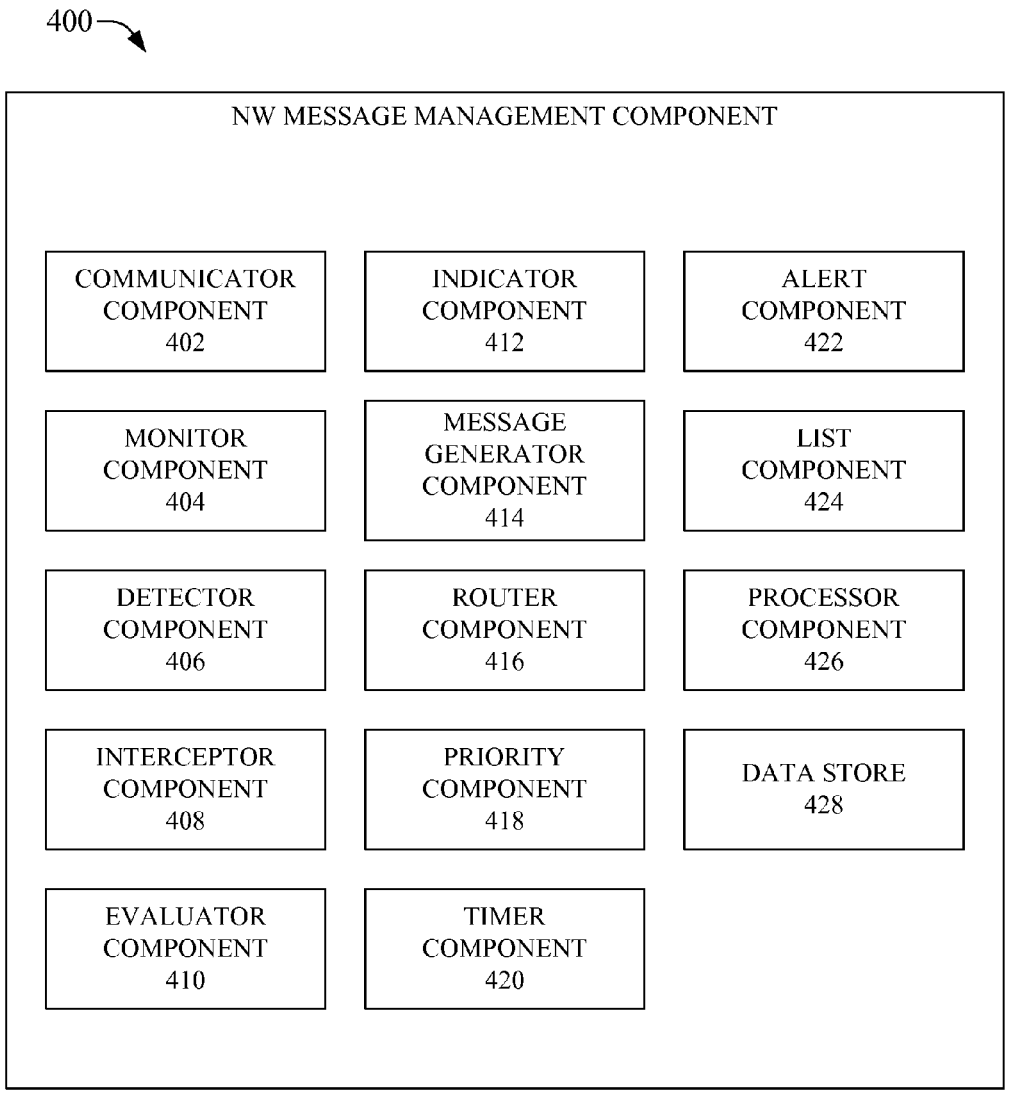
FIG. 4 depicts a block diagram of an example network message management component in accordance with an aspect of the disclosed subject matter.

The following is an example communication flow wherein message forwarding is not desired by the forward target UE or associated forward target UE user. A target UE user can desire to have messages sent to target UE 304 forwarded to forward target UE 306, and can use the target UE 304 to communicate with the NW message management component 316 to set a message routing rule that specifies that messages (e.g., SMS, MMS, etc.) sent to the target UE 304 are to be forwarded to the forward target UE 306. The NW message management component 316 can store the message routing rule in the user profile associated with the target UE user, wherein the user profile can be stored in a data store (not shown in FIG. 3; e.g., as shown in FIG. 4) associated with the NW message management component 316.

In another aspect, the forward target UE user can desire to not receive messages from the originating UE 302, and can use the forward target UE 306 to communicate with the NW message management component 316 to request to set, and set, a message routing rule that declines or prohibits messages, including forwarded messages, from the originating UE 302. The NW message management component 316 can store that message routing rule declining messages from originating UE 302 in the user profile associated with the forward target UE user, wherein that user profile can be stored in the data store associated with the NW management component 316.

When a message is sent from originating UE 302 to target UE 304, the message can be routed through MSC 318 to message service center 324. The NW message management component 316 can detect and intercept that message, can access the user profiles associated with the target UE user and forward target UE user to analyze the respective message routing rules therein, and can determine that, while the message routing rule in the user profile of the target UE user requests that the message be forwarded to the forward target UE 306, the message routing rule in the user profile of the forward target UE user specifies that messages from originating UE 302 are not desired (e.g., are prohibited, or to be declined), and applying these message routing rules and logic, can determine that the message is not to be forwarded to the forward target UE 306 and the message is to be delivered to a message box 332 associated with the target UE 304. The NW message management component 316 can communicate with the message service center 324 to notify the message service center 324 that the message is to be routed and delivered to the message box 332 associated with the target UE 304, and the message service center 324 can deliver the message to the message box 332.

The following is an example communication flow wherein message forwarding is not desired by the originating UE or associated originating UE user. A target UE user can desire to have messages that are sent to target UE 304 forwarded to forward target UE 306, and can use the target UE 304 to communicate with the NW message management component 316 to set a message routing rule that specifies that messages (e.g., SMS, MMS, etc.) sent to the target UE 304 are to be forwarded to the forward target UE 306. The NW message management component 316 can store the message routing rule in the user profile associated with the target UE user, wherein the user profile can be stored in a data store (not shown in FIG. 3; e.g., as shown in FIG. 4) associated with the NW message management component 316.

In another aspect, the originating UE user can desire to not have messages sent from the originating UE 302 forwarded to another UE (e.g., forward target UE 306), and to facilitate such forwarding restriction, when sending a message to the target UE 304, the originating UE user can use the originating UE 302 to add a message-forwarding-allowance indicator (e.g., a per-message message-forwarding-allowance indicator), which is set to message-forwarding-prohibited value (e.g., message-forwarding-prohibited value can be NO or 0), to the message, and the message and associated indicator can be sent.

The message can be routed through MSC 318 to message service center 324. The NW message management component 316 can detect and intercept that message, can analyze the information (e.g., indicator) in the message, and can determine that the message-forwarding-allowance indicator in the message specifies that this message is not to be forwarded, and applying the message routing rules and logic, can determine that the message is not to be forwarded to the forward target UE 306 and the message is to be delivered to a message box 332 associated with the target UE 304. The NW message management component 316 can communicate with the message service center 324 to notify the message service center 324 that the message is to be routed and delivered to the message box 332 associated with the target UE 304, and the message service center 324 can deliver the message to the message box 332.

The following is an example communication flow wherein message forwarding is desired by the targeting UE user and forwarding is not restricted by the originating UE 302 or forward target UE 306. In an aspect, the target UE user can use the target UE 304 to communicate with the NW message management component 316 to request, and set a message routing rule for, forwarding of messages to forward target UE 306, and the message routing rule can be stored in the user profile associated with the target UE user, wherein that user profile can be stored in a data store associated with the NW message management component 316. The forward target UE user does not restrict receiving a message from the originating UE 302, and the originating UE user does not restrict forwarding of a message being sent from the originating UE 302 to the target UE 304.

When a message is sent from the originating UE 302, the message can be received by the MSC 318, wherein the NW message management component 316 can detect and intercept the message; can analyze the message and can determine that there is no indicator (or that the message-forwarding-allowance indicator is set to allow message forwarding); can access the user profiles associated with the target UE user, forward target UE user, and originating UE user to analyze the respective message routing rules therein, and can determine that, the message routing rule in the user profile of the target UE user requests that the message be forwarded to the forward target UE 306, and the user profiles of the originating UE user and forward target UE user do not include any rules prohibiting forwarding of the message; and applying the message routing rules and logic, can determine that the message is to be forwarded to the forward target UE 306. The NW message management component 316 can, for example, in a copy of the message, replace the recipient address (e.g., target UE identifier) with the address of the forward target UE 306 (e.g., forward target UE identifier). The copy of the message also can include (e.g., optionally, for example, as desired by the forward target UE and associated user) information indicating which UE (e.g., target UE 304) was the original recipient, so that the forward target UE user can be informed as to which UE was the original recipient. The NW message management component 316 can communicate the copy of the message to the message service center 324 and can notify the message service center 324 that the message is to be routed and delivered to the forward target UE 306, and the message service center 324 can deliver the message to the forward target UE 306. If the message box option has been selected by the target UE user for the target UE 304, the message also can be delivered by the message service center 324 to the message box 332 associated with the target UE 304.

In accordance with an embodiment of the disclosed subject matter, one or more components (e.g., UE, NW message management component, handset message management component, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to detecting a message that is being sent from an originating UE to a target UE; whether a message sent from an originating UE to a target UE is to be forwarded to a forward target UE; whether a message sent from an originating UE is to be forwarded to a destination besides or in addition to a target UE and/or forward target UE; a priority level associated with a message; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

FIG. 4 depicts a block diagram of an example NW message management component 400 in accordance with an embodiment of the disclosed subject matter. In an aspect, the NW message management component 400 can comprise a communicator component 402 that can be employed to communicate (e.g., transmit, receive) information, including information relating to messages, between the NW message management component 400 and other components or devices, such as UEs, routers, switches, etc., associated with a communication network environment.

In an aspect, the NW message management component 400 can contain a monitor component 404 that can monitor messages being communicated between UEs associated with the communication network. In another aspect, the NW message management component 400 can include a detector component 406 that can sense or detect information relating to a message being sent from an originating UE to a target UE, wherein the information can include, for example, an originating UE identifier or address associated with the message, a target UE identifier or address associated with the message, a forward target UE identifier or address associated with the message, a type of message, a message-forwarding-allowance indicator, a forwarding indicator, a priority level, a time of transmission of the message, metadata, etc., related thereto. In still another aspect, the NW message management component 400 also can include an interceptor component 408 that can intercept a message that is sent from an originating UE to a target UE, for example, when forwarding (e.g., automatic forwarding) of the message is desired by the target UE.

In yet another aspect, the NW message management component 400 can comprise an evaluator component 410 that can evaluate information relating to a message sent from an originating UE to a target UE to facilitate determining whether the message is to be forwarded (e.g., automatically forwarded) to a forward target UE(s), whether the forward target UE(s) desires to accept a forwarded message, and/or other actions to take in relation to the message, wherein the information can include, for example, an originating UE identifier or address associated with the message; a target UE identifier or address associated with the message; a forward target UE identifier or address associated with the message; a type of message; a message-forwarding-allowance indicator; a forwarding indicator; information contained in user profiles respectively associated with the originating UE, target UE, or forward target UE; a priority level; a time of transmission of the message; metadata; etc.

In an aspect, the NW message management component 400 can comprise an indicator component 412 that can generate or insert a desired indicator into a message to facilitate desired routing of a message. For example, the indicator component 412 can generate and insert a forwarding indicator in a forwarded message indicating that the message is a forwarded message (e.g., a message is a forwarded message when a message from an originating UE is being forwarded by a target UE to a forward target UE) to facilitate identification of the forwarded message as being a forwarded message by the forward target UE.

The NW message management component 400 also can employ a message generator component 414 that can copy and/or generate a message to facilitate forwarding a message to a desired forward target UE(s) and/or sending the message to another desired destination (e.g., message box). The message generator component 414 can include, in the message, information relating to the original message and/or additional information (e.g., forwarding indicator, forward target UE identifier, destination identifier (e.g., for message box), etc.).

In still another aspect, the NW message management component 400 can include a router component 416 that can route messages communicated between UEs in accordance with applicable routing rules. The applicable message routing rules can be rules included in user profiles associated with UEs related to a particular message, rules implemented in response to information received from a UE user(s) (e.g., an indication from a user associated with a forward target UE as to whether to receive a forwarded message), service provider rules, etc.

The NW message management component 400 also can include a priority component 418 that can identify or determine a priority of a message being sent from an originating UE to a target UE to facilitate determining whether to forward the message from the target UE to a forward target UE(s). The priority component 418 can identify a priority level in a message (e.g., based at least in part on a priority level indicator in the message) or can analyze a message (e.g., analyze message content or other related information) to identify or determine the priority level of the message.

In another aspect, the NW message management component 400 can contain a timer component 420 that can track time relating to UEs to facilitate determining routing of messages between UEs. For instance, the timer component 420 can track and identify a current time a message is being sent or an amount of time that has elapsed since a routing rule(s) (e.g., routing rule relating to message routing based at least in part on time) has been implemented, wherein the routing rule(s) can be stored in a user profile. For example, a UE user can select a message routing parameter that provides that messages sent to the user's UE (e.g., target UE) are to be forwarded to a forward target UE during a specified period of time (e.g., between 3:00 p.m. and 5:00 p.m.) or for a specified amount of time (e.g., for the next 2 hours). The evaluator component 410 can operate in conjunction with the timer component 420 to facilitate determining whether a message to the target UE is to be forwarded to a forward target UE when a time-based routing rule is implemented.

In yet another aspect, the NW message management component 400 can comprise an alert component 422 that can generate and transmit a desired alert signal to a UE (e.g., forward target UE), for example, to alert a UE user that a message is available to be sent to and received by the UE, or is being sent to and received by the UE. The alert signal can be, for example, an alert message, which can include desired information (e.g., the originating identifier, target identifier, time of the message, priority of the message, etc.), or can be a visual, audio, or other sensory (e.g., vibration) signal.

In an embodiment, the NW message management component 400 optionally can include a list component 424 that can generate, maintain, edit, update one or more lists (e.g., white list, black list, forwarding-desired list or forwarding-allowed list, forwarding-restricted list, automatic response list, etc.) of UE identifiers or other information, wherein a UE user can specify UE identifiers that are to be included in a particular list. For example, the list component 424 can generate a list that includes respective UE identifiers associated with respective UEs for which message forwarding is desirable by a forward target UE or a list that includes respective UE identifiers associated with respective UEs for which message forwarding is prohibited by a forward target UE. As another example, the list component 424 can generate a list that includes respective UE identifiers associated with respective UEs (e.g., target UE, forward target UE) for which message forwarding is permitted by an originating UE or a list that includes respective UE identifiers associated with respective UEs (e.g., target UE, forward target UE) for which message forwarding is prohibited by an originating UE. As still another example, the list component 424 can generate a list(s) that includes respective UE identifiers associated with respective UEs (e.g., originating UE, target UE) for which an automatic response message is desired to be sent, wherein a respective list can be associated with a respective automatic response message, or a list that includes respective UE identifiers associated with respective UEs (e.g., originating UE, target UE) for which an automatic response message is not desired to be sent. As yet another example, the list component 424 can generate a list(s) that includes respective UE identifiers associated with respective UEs (e.g., target UE, forward target UE) from which receiving an automatic response message is allowed, or a list that includes respective UE identifiers associated with respective UEs (e.g., target UE, forward target UE) from which receiving an automatic response message is not desired.

In yet another aspect, the NW message management component 400 can comprise a processor component 426 that can work in conjunction with the other components (e.g., communicator component 402, monitor component 404, detector component 406, interceptor component 408, evaluator component 410, indicator component 412, message generator component 414, router component 416, priority component 418, timer component 420, alert component 422, list component 424, etc.) to facilitate performing the various functions of the NW message management component 400. The processor component 426 can employ one or more processors, microprocessors, or controllers that can process data, such as information relating to messaging by UEs in the communication network, information relating to operations of the NW message management component 400, and/or other information, etc., to facilitate operation of the NW message management component 400, as more fully disclosed herein, and control data flow between the NW message management component 400 and other components (e.g., UE, other components in the communication network, etc.) associated with the NW message management component 400.

The NW message management component 400 also can include a data store 428 that can store data structures (e.g., user data, metadata), code structure(s) (e.g., modules, objects, hashes, classes, procedures) or instructions, information relating to messaging associated with UEs operating in the communication network, user profiles associated with respective UEs or UE users, information relating to operations of the NW message management component 400, list information, predefined routing criteria (and corresponding predefined routing rules), etc., to facilitate controlling operations associated with the NW message management component 400. In an aspect, the processor component 426 can be functionally coupled (e.g., through a memory bus) to the data store 428 in order to store and retrieve information desired to operate and/or confer functionality, at least in part, to the communicator component 402, monitor component 404, detector component 406, interceptor component 408, evaluator component 410, indicator component 412, message generator component 414, router component 416, priority component 418, timer component 420, alert component 422, list component 424, and/or substantially any other operational aspects of the NW message management component 400.

Figure 5:
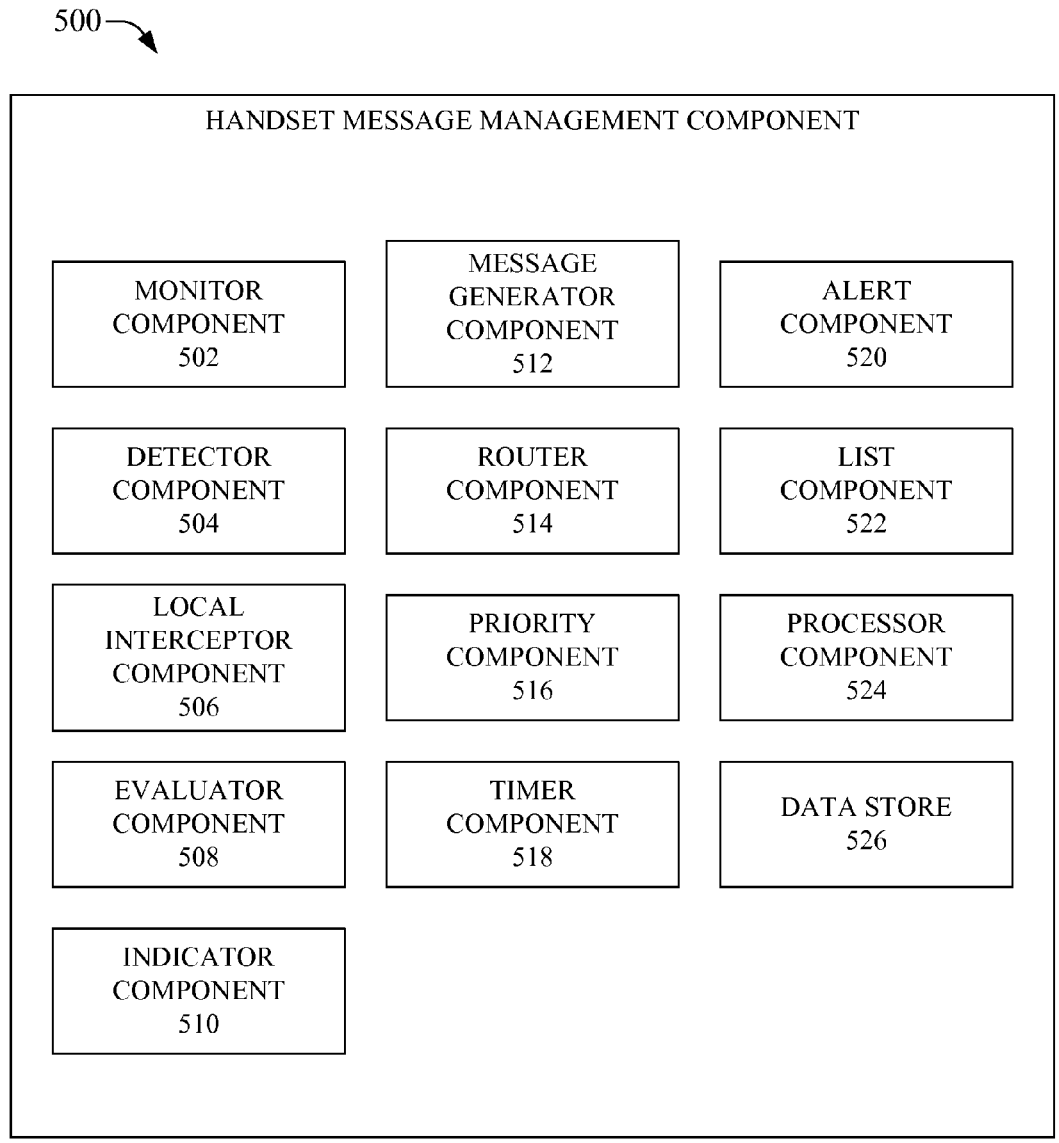
FIG. 5 depicts a block diagram of an example handset message management component in accordance with an embodiment of the disclosed subject matter.

FIG. 5 depicts a block diagram of an example handset message management component 500 in accordance with an embodiment of the disclosed subject matter. In an aspect, the handset message management component 500 can comprise a monitor component 502 that can monitor messages being communicated between UEs associated with the communication network. In another aspect, the handset message management component 500 can include a detector component 504 that can sense or detect information relating to a message being sent from an originating UE to a target UE, wherein the information can include, for example, an originating UE identifier or address associated with the message, a target UE identifier or address associated with the message, a forward target UE identifier or address associated with the message, a type of message, a message-forwarding-allowance indicator, a forwarding indicator, a priority level, a time of transmission of the message, metadata, etc., related thereto. In still another aspect, the handset message management component 500 also can include a local interceptor component 506 that can intercept a message that is sent from an originating UE to a target UE that includes the handset message management component 500, for example, when forwarding (e.g., automatic forwarding) of the message is desired by the target UE and allowed by the originating UE that sent the message to the target UE.

In yet another aspect, the handset message management component 500 can comprise an evaluator component 508 that can evaluate information relating to a message sent from an originating UE to a target UE to facilitate determining whether the message is to be forwarded (e.g., automatically forwarded) to a forward target UE(s), whether the forward target UE(s) desires to accept a forwarded message, and/or other actions to take in relation to the message, wherein the information can include, for example, an originating UE identifier or address associated with the message; a target UE identifier or address associated with the message; a forward target UE identifier or address associated with the message; a type of message; a message-forwarding-allowance indicator; a forwarding indicator; information contained in user profiles respectively associated with the originating UE, target UE, or forward target UE; a priority level; a time of transmission of the message; metadata; etc.

In an aspect, the handset message management component 500 can comprise an indicator component 510 that can generate or insert a desired indicator into a message to facilitate desired routing of a message. For example, the indicator component 510 can generate and insert a forwarding indicator in a forwarded message indicating that the message is a forwarded message (e.g., a message is a forwarded message when a message from an originating UE is being forwarded by a target UE to a forward target UE) to facilitate identification of the forwarded message as being a forwarded message by the forward target UE. As another example, the indicator component 510 can generate and insert a message-forwarding-allowance indicator in a message (e.g., originating message) that can indicate whether forwarding of the message is permitted or prohibited.

The handset message management component 500 also can employ a message generator component 512 that can copy and/or generate a message to facilitate forwarding a message to a desired forward target UE(s) and/or sending the message to another desired destination (e.g., message box). The message generator component 512 can include, in the message, information relating to the original message and/or additional information (e.g., forwarding indicator, forward target UE identifier, destination identifier (e.g., for message box), etc.).

In still another aspect, the handset message management component 500 can include a router component 514 that can route messages communicated between UEs in accordance with applicable routing rules. The applicable message routing rules can be rules included in user profiles associated with UEs that are related to a particular message, rules implemented in response to information received from a UE user(s) (e.g., an indication from a user associated with a forward target UE as to whether to receive a forwarded message), rules created by a service provider(s), etc.

The handset message management component 500 also can include a priority component 516 that can identify or determine a priority of a message being sent from an originating UE to a target UE to facilitate determining whether to forward the message from the target UE to a forward target UE(s). The priority component 516 can identify a priority level in a message (e.g., based at least in part on a priority level indicator in the message) or can analyze a message (e.g., analyze message content or other related information) to identify or determine the priority level of the message.

In another aspect, the handset message management component 500 can contain a timer component 518 that can track time relating to UEs to facilitate determining routing of messages between UEs. For instance, the timer component 518 can track and identify a current time a message is being sent or an amount of time that has elapsed since a routing rule(s) (e.g., routing rule relating to message routing based at least in part on time) has been implemented, wherein the routing rule(s) can be stored in a user profile. For example, a UE user can select a message routing parameter that provides that messages sent to the user's UE (e.g., target UE) are to be forwarded to a forward target UE during a specified period of time (e.g., between 3:00 p.m. and 5:00 p.m.) or for a specified amount of time (e.g., for the next 2 hours). The evaluator component 508 can operate in conjunction with the timer component 518 to facilitate determining whether a message to the target UE is to be forwarded to a forward target UE when a time-based routing rule is implemented.

In yet another aspect, the handset message management component 500 can comprise an alert component 520 that can generate and present a desired alert signal on the associated UE, for example, to alert the UE user that a message (e.g., forwarded message) is available to be received by the UE or is being received by the UE. The alert signal can be, for example, an alert message, which can include desired information (e.g., the originating identifier, target identifier, time of the message, priority of the message, etc.), or can be a visual, audio, or other sensory (e.g., vibration) signal.

In an embodiment, the handset message management component 500 optionally can include a list component 522 that can generate, maintain, edit, update one or more lists (e.g., white list, black list, forwarding-desired list or forwarding-allowed list, forwarding-restricted list, automatic response list, etc.) of UE identifiers or other information, wherein a UE user can specify UE identifiers that are to be included in a particular list. The list component 522 can comprise the same or similar functionality as list component 424, for example.

In yet another aspect, the handset message management component 500 can comprise a processor component 524 that can work in conjunction with the other components (e.g., monitor component 502, detector component 504, interceptor component 506, evaluator component 508, indicator component 510, message generator component 512, router component 514, priority component 516, timer component 518, alert component 520, list component 522, etc.) to facilitate performing the various functions of the handset message management component 500. The processor component 524 can employ one or more processors, microprocessors, or controllers that can process data, such as information relating to messaging by UEs in the communication network, information relating to operations of the handset message management component 500, and/or other information, etc., to facilitate operation of the handset message management component 500, as more fully disclosed herein, and control data flow between the handset message management component 500 and other components (e.g., UEs, APs, other components in the communication network, etc.) associated with the handset message management component 500.

The handset message management component 500 also can include a data store 526 that can store data structures (e.g., user data, metadata), code structure(s) (e.g., modules, objects, hashes, classes, procedures) or instructions, information relating to messaging associated with UEs operating in the communication network, user profiles associated with respective UEs or UE users, information relating to operations of the handset message management component 500, list information, predefined routing criteria (and corresponding predefined routing rules), etc., to facilitate controlling operations associated with the handset message management component 500. In an aspect, the processor component 524 can be functionally coupled (e.g., through a memory bus) to the data store 526 in order to store and retrieve information desired to operate and/or confer functionality, at least in part, to the monitor component 502, detector component 504, interceptor component 506, evaluator component 508, indicator component 510, message generator component 512, router component 514, priority component 516, timer component 518, alert component 520, list component 522, and/or substantially any other operational aspects of the handset message management component 500.

Figure 6:
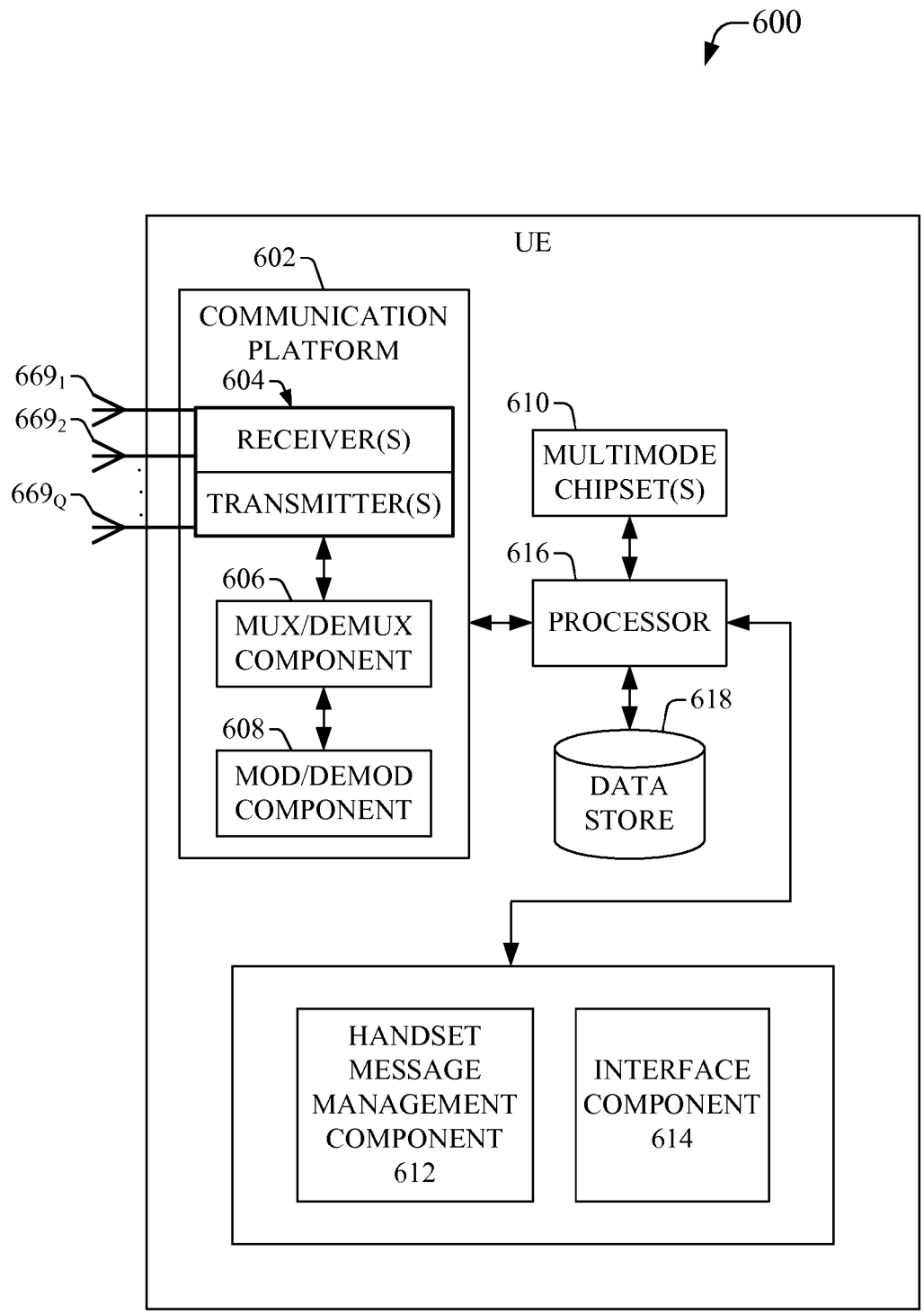
FIG. 6 illustrates a block diagram of an example user equipment (UE) in accordance with an aspect of the disclosed subject matter.

FIG. 6 depicts a block diagram of an example UE 600 in accordance with an aspect of the disclosed subject matter. In an aspect, the UE 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ are a part of communication platform 602, which comprises electronic components and associated circuitry that provide for processing and manipulation of received signal(s) and signal(s) to be transmitted; e.g., receivers and transmitters 604, multiplexer/demultiplexer (mux/demux) component 606, and modulation/demodulation (mod/demod) component 608.

In another aspect, the UE 600 can include a multimode operation chipset(s) 610 that can allow the UE 600 to operate in multiple communication modes in accordance with disparate technical specification for wireless technologies. In an aspect, multimode operation chipset(s) 610 can utilize communication platform 602 in accordance with a specific mode of operation (e.g., voice, GPS). In another aspect, multimode operation chipset(s) 610 can be scheduled to operate concurrently (e.g., when Q>1) in various modes or within a multi-task paradigm.

In still another aspect, the UE 600 can comprise a handset message management component 612 that can facilitate conditionally controlling forwarding (e.g., automatic forwarding) of messages being sent to the UE 600, sent from the UE 600, and/or forwarded on behalf of the UE 600, as more fully described herein. The handset message management component 612 also can facilitate conditionally controlling generating, sending, and/or receiving of automatic response messages and/or selecting and controlling other messaging options, as more fully described herein. The handset message management component 612 also can interact or communicate with a NW message management component to facilitate setting desired message routing rules, desired message routing parameters, messaging options, and/or other desired parameters to facilitate conditionally controlling forwarding of messages, or generating, sending or receiving automatic response messages, on a network level.

The UE 600 can contain an interface component 614 that can comprise one or more interfaces (e.g., display screens, touch screens, buttons, controls, switches, adapters, connectors, speakers, etc.) that can be utilized to facilitate presentation of information to a UE user or receiving data input from a UE user. In an aspect, the interface component 614 can present messages or information related to messages to the UE user. For example, the interface component 614 can operate in conjunction with the handset message management component 612 to facilitate presentation of buttons, controls, or menus to facilitate selecting or setting desired message routing rules, message routing parameters, messaging options, etc. In an aspect, the interface component 614 can receive input, via manipulation of buttons, controls, or menus by the UE user to facilitate selecting or setting desired message routing rules, message routing parameters, messaging options, etc, and the UE 600 can be configured to operate in accordance with the such received input and/or information relating to such received input can be communicated to a NW message management component or other desired component in the communication network. In an embodiment, if a message (e.g., forwarded message) is locally blocked from being received by the UE 600, for example, when the message routing rules of the UE 600 are set to prohibit receiving forwarded messages or when a UE user (e.g., forward target UE user) declines to accept a forwarded message, the interface component 614 can facilitate automatic or manual transmission of a signal or message from the UE 600 to a NW message management component in the communication network to convey to the NW message management component that the message (e.g., forwarded message) was locally declined by the UE 600, and the user account associated with the UE 600 can or may be credited (or not billed) for costs related to the undelivered message.

In still another aspect, the UE 600 also can include a processor(s) 616 that can be configured to confer functionality, at least in part, to substantially any electronic component within the UE 600, in accordance with aspects of the disclosed subject matter. For example, the processor(s) 616 can facilitate enabling the UE 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 616 can facilitate enabling the UE 600 to process data relating to messaging, voice calls, or other services (e.g., Internet services or access, services related to applications, etc.).

The UE 600 also can contain a data store 618 that can store data structures (e.g., user data, metadata); code structure(s) (e.g., modules, objects, classes, procedures) or instructions; message hashes; neighbor cell list; one or more lists (e.g., whitelist; blacklist, forwarding-desired list or forwarding-allowed list, forwarding-restricted list, automatic response list, etc.); information relating to messaging (e.g., message routing rules, message-related indicators, message routing parameters, messaging options, etc.), voice calls, or other services associated with the UE 600; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 616 can be functionally coupled (e.g., through a memory bus) to the data store 618 in order to store and retrieve information (e.g., neighbor cell list; information relating to mobile messaging, voice calls, or other services; frequency offsets; desired algorithms; etc.) desired to operate and/or confer functionality, at least in part, to communication platform 602, multimode operation chipset(s) 610, handset message management component 612, and interface component 614, and/or substantially any other operational aspects of the UE 600.

Figure 7:
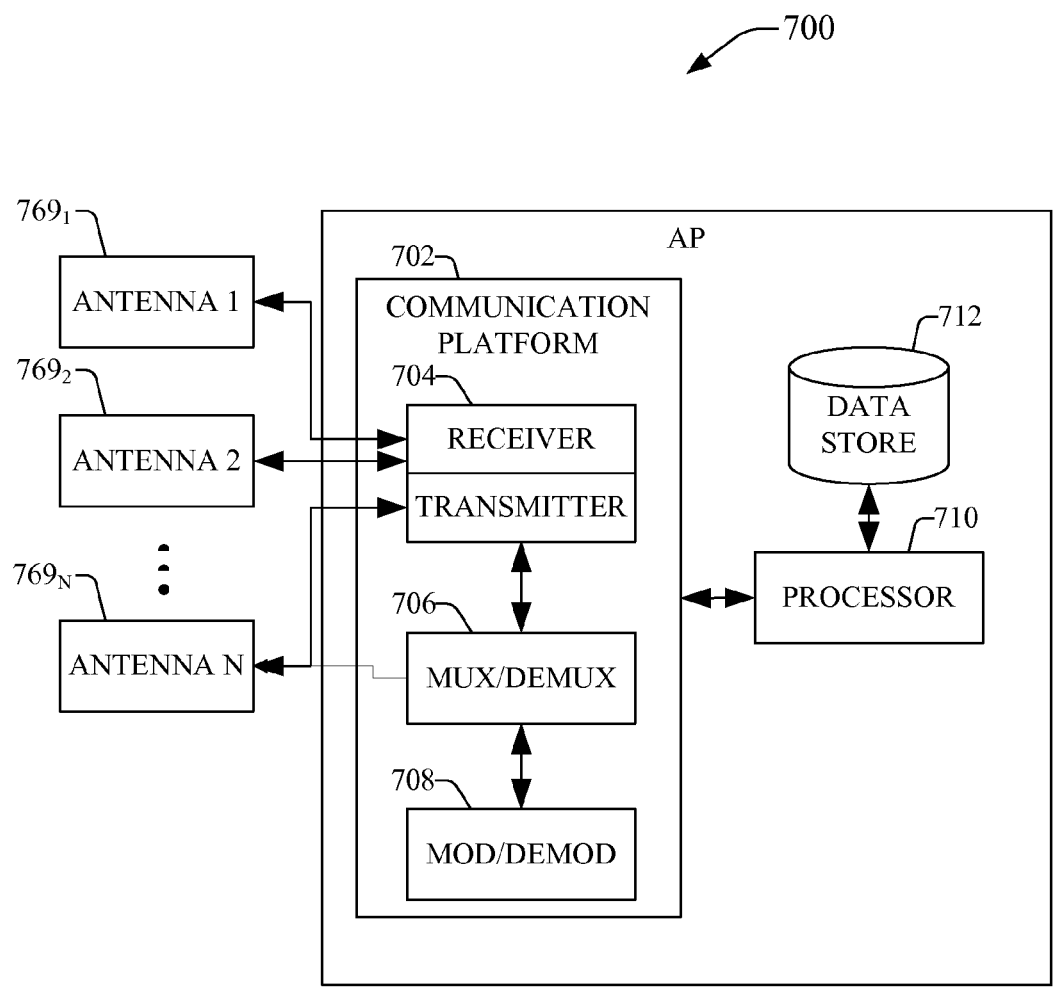
FIG. 7 illustrates a block diagram of an example access point (AP) in accordance with an aspect of the disclosed subject matter.

FIG. 7 illustrates a block diagram of an example AP 700 (e.g., femtocell, picocell, macro base station, etc.) in accordance with an aspect of the disclosed subject matter. The AP 700 can receive and transmit signal(s) from and to wireless devices like access points (e.g., femtocells, picocells, base stations, etc.), access terminals (e.g., UEs), wireless ports and routers, and the like, through a set of antennas $769_1$-$769_N$. In an aspect, the antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 710 also can facilitate other operations on data, for example, to facilitate managing or maintaining a white list that includes information, such as communication device identifiers associated with communication devices that can connect to the AP 700 to communicate voice or data, etc.

In another aspect, the AP 700 can include a data store 712 that can store data structures; code instructions; rate coding information; information relating to measurement of radio link quality or reception of information related thereto; information relating to establishing a communications connection between a communication device (e.g., UE) and other communication devices, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 710 can be coupled to the data store 712 in order to store and retrieve information (e.g., information, such as algorithms, relating to multiplexing/demultiplexing or modulation/demodulation, information relating to radio link levels, information relating to establishing communication connections associated with a UE(s) served by the AP 700, information relating to the white list, etc.) desired to operate and/or confer functionality to the communication platform 702, and/or other operational components of AP 700.

In view of the example systems and/or devices described herein, example methodologies that can be implemented in accordance with the disclosed subject matter can be better appreciated with reference to flowcharts in FIGS. 8-11. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 8:
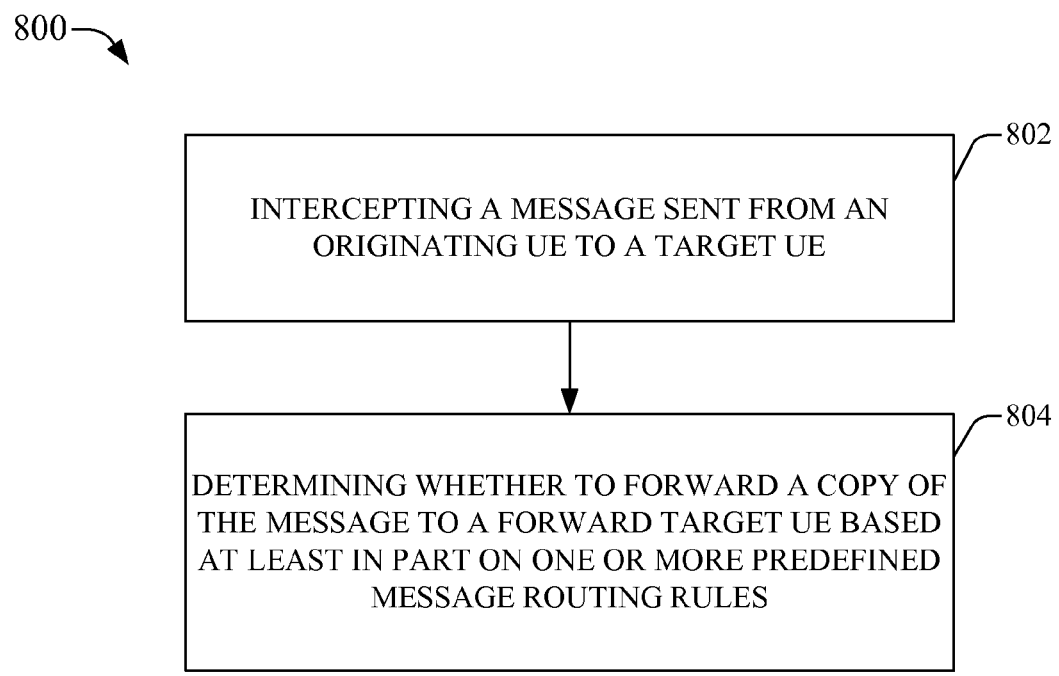
FIG. 8 illustrates a flowchart of an example method for conditional forwarding of messages in accordance with various aspects and embodiments of the disclosed subject matter.

FIG. 8 presents a flowchart of an example method 800 for conditional forwarding of messages in accordance with various aspects and embodiments of the disclosed subject matter. At 802, a message sent from an originating UE to a target UE can be intercepted.

At 804, a determination can be made regarding whether to forward a copy of the message to a forward target UE based at least in part on one or more predefined message routing rules. In an aspect, a message management component (e.g., NW message management component, handset management component) can analyze information associated with the message (e.g., UE identifiers, associated indicators, etc.) and/or user profiles associated with the originating UE, target UE, and/or forward target UE, wherein applicable message routing rules can be identified, to facilitate determining whether to send a copy of the message to a forward target UE or not. If in accordance with the applicable message routing rules, a copy of the message is to be forwarded to the forward target UE, a copy of the message can be forwarded to the forward target UE, wherein the recipient address in the message copy can be replaced with the UE identifier associated with the forward target ID to facilitate delivering the message copy to the forward target UE. If in accordance with the applicable message routing rules, a copy of the message is not to be forwarded to the forward target UE, no copy of the message will be forwarded to the forward target UE, although, as desired, the message can be delivered to the target UE and/or a message box (e.g., electronic message box) associated with the target UE.

Figure 9:
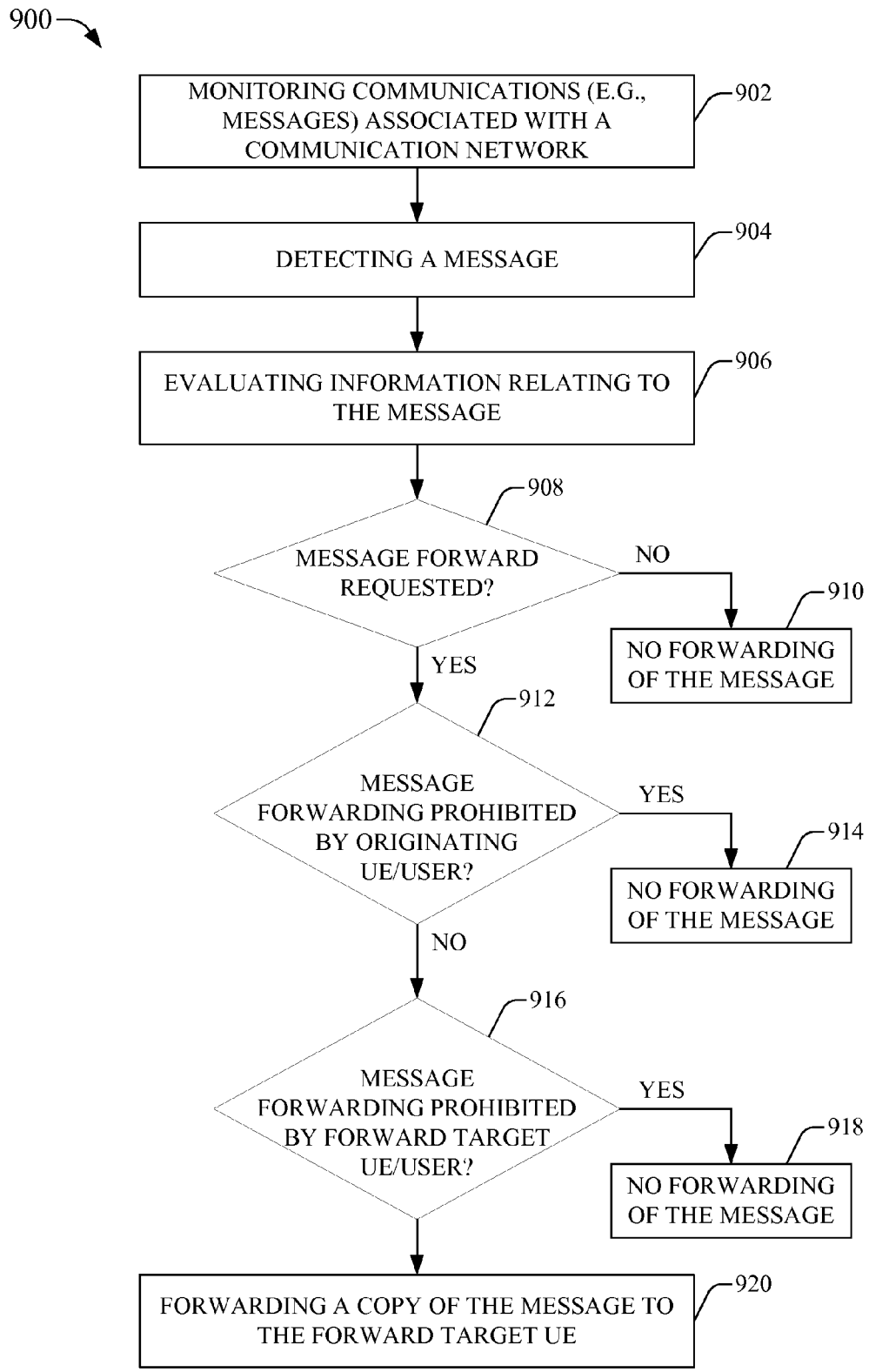
FIG. 9 depicts a flowchart of an example method that can conditionally forward messages in accordance with various aspects of the disclosed subject matter.

FIG. 9 illustrates a flowchart of an example method 900 that can conditionally forward messages in accordance with various aspects of the disclosed subject matter. At 902, communications (e.g., messages) associated with a communication network can be monitored. At 904, a message can be detected. At 906, information relating to the message can be evaluated. The information can comprise message content, metadata (e.g., priority level, size, time message was sent, indicator (e.g., message-forwarding-allowance indicator)), originating UE identifier target UE identifier, user profiles (e.g., user profile associated with originating UE, user profile associated with target UE, user profile associated with forward target UE), applicable message routing rules (e.g., as contained in the user profiles, etc.

At 908, a determination can be made regarding whether the target UE or associated target UE user desires (e.g., requests) that the message be forwarded to a forward target UE. For instance, information contained in the user profile associated with the target UE or target UE user can be analyzed to determine whether the target UE or associated target UE user desires to have the message forwarded to a forward target UE. For example, the user profile can comprise information providing that messages from that originating UE are to be forwarded to the desired forward target UE, messages sent to the target UE during a specified time period are to be forwarded to the forward target UE, or messages having at least a predefined minimum threshold priority level for forwarding are to be forwarded to the forward target UE, among other message routing criteria and message routing rules, such as more fully disclosed herein, that can be employed.

If it is determined that there is no desire to forward the message (e.g., the target UE has not requested to automatically forward the message), at 910, a copy of the message will not be forwarded to a forward target UE, although the message can be delivered to the target UE and/or optionally a copy of the message can be delivered to a message box associated with the target UE. If, at 908, it is determined forwarding of the message is desired (e.g., by the target UE or associated target UE user), at 912, a determination can be made regarding whether the originating UE or associated originating UE user is prohibiting forwarding of the message. For instance, a message-forwarding-allowance indicator associated with the message can be evaluated to identify whether forwarding of the message has been prohibited by the originating UE (or associated user).

If it is determined that forwarding of the message is prohibited by the originating UE (or associated originating UE user), at 914, a copy of the message will not be forwarded to the forward target UE, although the message can be delivered to the target UE and/or optionally a copy of the message can be delivered to a message box associated with the target UE. For example, if message-forwarding-allowance indicator is set to a message-forwarding-prohibited value, it can be determined that forwarding of the message is prohibited by the originating UE (or originating UE user). The message-forwarding-allowance indicator can be attached to or inserted in the message on a per message basis or in accordance with information contained in the user profile associated with the originating UE or originating UE user. Alternatively, if there is no message-forwarding-allowance indicator in the message, this can indicate that forwarding of the message is not restricted, and including a message-forwarding-allowance indicator in the message can indicate that forwarding of the message is restricted.

If, at 912, it is determined that forwarding of the message is not prohibited by the originating UE (or associated originating UE user) (e.g., message-forwarding-allowance indicator is set to message-forwarding-allowed value), at 916, a determination can be made regarding whether forwarding of the message to the forward target UE is prohibited by the forward target UE or associated forward target UE user. For instance, information in the user profile associated with the forward target UE can be analyzed to determine whether the forward target UE prohibits forwarding of message to the forward target UE and/or an alert (e.g., forwarding message alert) can be sent to the forward target UE to prompt the forward target UE user to indicate whether the forward target UE user desires to receive the forwarded message or not. In an aspect, when conditional message forwarding control is being performed on a local level by the handset message management component associated with the forward target UE, the handset message management component can recognize or identify that the message is a forwarded message based at least in part on a forwarding indicator that can be included in or associated with the copy of the message being forwarded.

If it is determined that forwarding of the message to the forward target UE is prohibited by the forward target UE or associated forward target UE user, at 918, a copy of the message will not be forwarded to the forward target UE, although the message can be delivered to the target UE and/or optionally a copy of the message can be delivered to a message box associated with the target UE and/or to a message box associated with the forward target UE. For instance, information (e.g., message routing rule(s)) contained in the user profile associated with the forward target UE or associated forward target UE user, or information received from the forward target UE user, can be analyzed to determine whether forwarding of the message to the forward target UE is prohibited by the forward target UE or associated forward target UE user. If a message routing rule(s) or information received from the forward target UE user indicates that message forwarding is prohibited, the message will not be forwarded to the forward target UE.

If, at 916, it is determined that forwarding of the message to the forward target UE is not prohibited by the forward target UE or associated forward target UE user, at 920, a copy of the message can be forwarded to the forward target UE, wherein the recipient address in the copy of the message being forwarded can be replaced with the UE identifier associated with the forward target UE (e.g., by the NW message management component or by the handset message management component associated with the target UE) to facilitate delivery of the message copy to the forward target UE. Also, the message can be delivered to the target UE and/or optionally a copy of the message can be delivered to a message box associated with the target UE and/or to a message box associated with the forward target UE.

Figure 10:
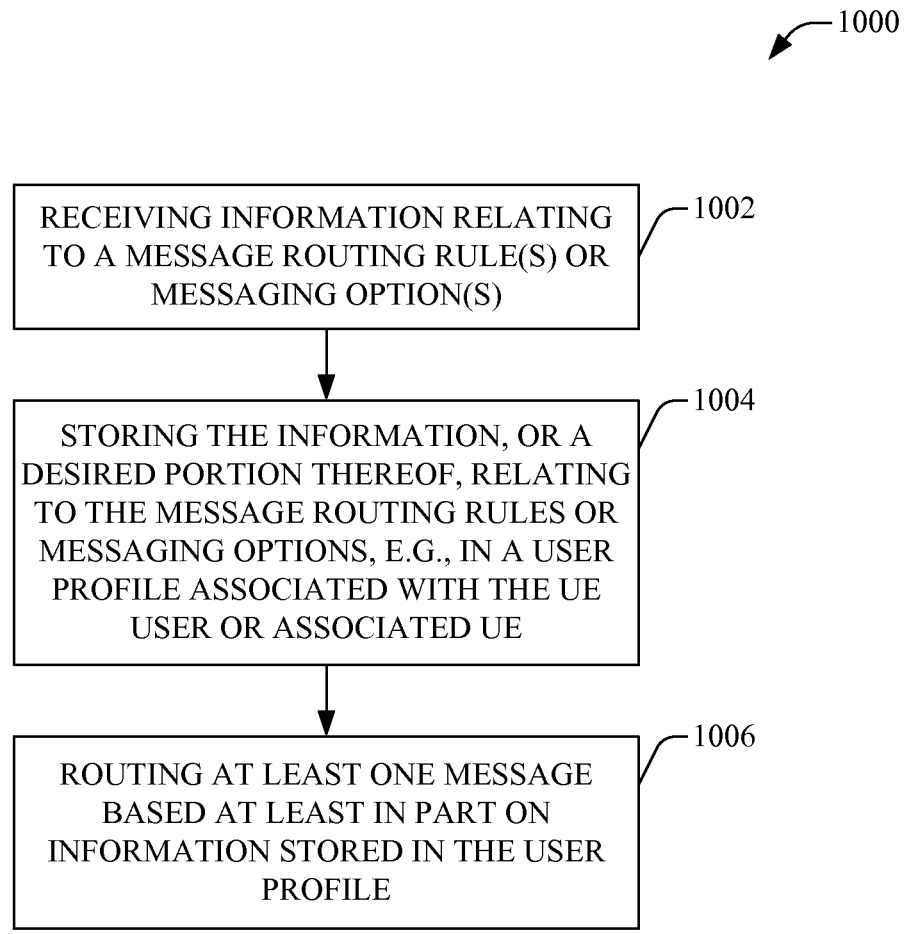
FIG. 10 illustrates a flowchart of an example method that can employ one or more message routing rules or messaging options to facilitate conditional forwarding of messages in accordance with aspects of the disclosed subject matter.

FIG. 10 depicts a flowchart of an example method 1000 that can employ one or more message routing rules or messaging options to facilitate conditional forwarding of messages in accordance with aspects of the disclosed subject matter. At 1002, information relating to a message routing rule(s) or messaging option(s) can be received. For instance, information can be received from a UE user, wherein the information can relate to message routing rules or messaging options that are desired to be implemented in relation to conditional forwarding of messages between UEs. The message routing rules or messaging options can relate to conditions on message forwarding when the UE user (or associated UE) is the originating UE user (e.g., message sender) (or associated originating UE), the target UE user (e.g., message recipient) (or associated target UE), or the forward target UE user (e.g., recipient of the forwarded message) (or associated forward target UE), whether an automatic response message is to be automatically sent to the UE from which a message (e.g., forwarded message) was received or originally sent, whether a copy of the message is to be delivered to a message box, etc. The message routing rules can relate to, for example, conditional message forwarding (e.g., message forwarding based at least in part on whether the message sender prohibits forwarding of the message, whether the target UE user desires to forward the message, whether the forward target UE user desires to receive a forwarded message, current operating state of the target UE and/or forward target UE, priority level of the message, time of transmission of the message, cost of forwarding a message, whether the message includes an attachment, size of the message, or other desired factors) or conditional sending of automatic response messages, such as more fully disclosed herein. The messaging options can relate to, for example, whether a target UE user or forward target UE user desire to have a copy of a message (e.g., message from an originating UE, forwarded message from a target UE) delivered to a respective message box.

At 1004, the information, or a desired portion thereof, relating to the message routing rules or messaging options can be stored, for example, in the user profile associated with the UE user or associated UE. The information also can include message routing parameters or messaging option parameters that correspond to the received information, for example.

At 1006, at least one message can be routed based at least in part on information stored in the user profile. When a message is intercepted to facilitate determining whether the message is to be forwarded or not, and the message relates to the user profile (e.g., the user profile is associated with the originating UE (or originating UE user), target UE (or associated target UE user), or forward target UE (or associated forward target UE user)), the user profile can be accessed and information stored therein can be analyzed to facilitate determining whether the message is to be forwarded or not. The message can be forwarded or not based at least in part on the user profile, other related profiles associated with other UEs related to the message, received information (e.g., per message message-forwarding-allowance indicator, received information forward target UE indicating that forwarding of the message is not desired, etc.), and/or other message routing criteria or rules or other information.

Figure 11:
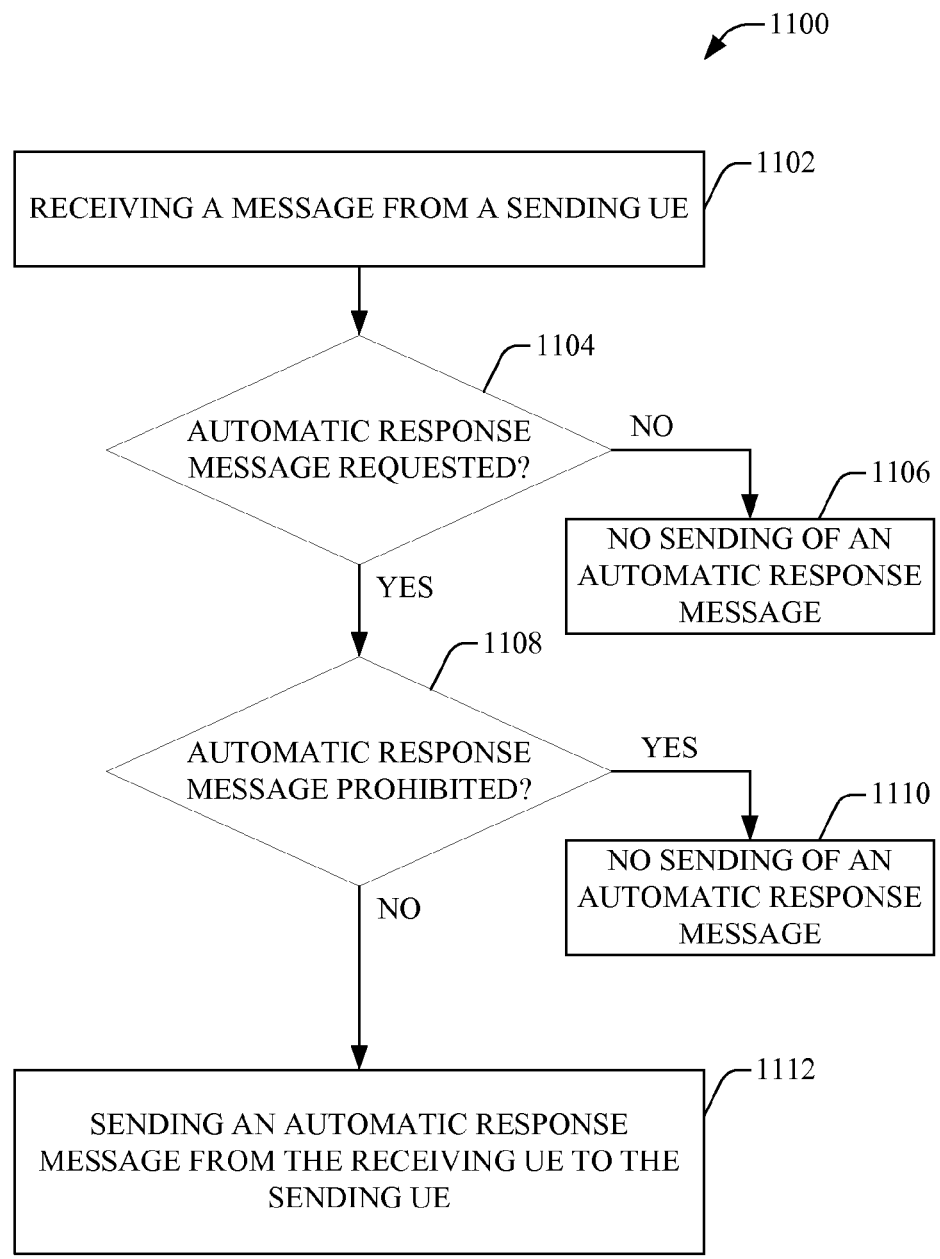
FIG. 11 depicts a flowchart of an example method that can conditionally send an automatic response message in response to a received message in accordance with aspects of the disclosed subject matter.

FIG. 11 illustrates a flowchart of an example method 1100 that can conditionally send an automatic response message in response to a received message in accordance with aspects of the disclosed subject matter. At 1102, a message can be received by a receiving UE from a sending UE. The message can be one that is received from an originating UE by a target UE or received from a target UE by a forward target UE.

At 1104, a determination can be made regarding whether the receiving UE desires to send (e.g., automatically send) an automatic response message to the sending UE. For instance, the user profile associated with the receiving UE (e.g., a target UE receiving a message from an originating UE, a forward target UE receiving a forwarded message from a target UE) can be analyzed, and based at least in part on analysis of the information contained in the user profile, it can be determined whether the receiving UE (or associated UE user) desires to send an automatic response message to the sending UE. If it is determined that the receiving UE (or associated UE user) does not desire to send an automatic response message to the sending UE, at 1106, no automatic response message is sent by the receiving UE to the sending UE.

If, at 1104, it is determined that the receiving UE (or associated UE user) desires to send an automatic response message to the sending UE, at 1108, a determination can be made regarding whether the sending UE does not desire to receive (e.g., prohibits receiving) an automatic response message. The determination regarding whether the sending UE does not desire to receive an automatic response message can be made based at least in part on an automatic-response-allowance indicator associated with the message sent to the receiving UE. For example, an automatic-response-allowance indicator can be associated with (e.g., attached to or included in) the message, wherein the automatic-response-allowance indicator can be set to an automatic-response-allowed value to indicate that the sending UE does not prohibit receiving an automatic response message from the receiving UE or set to an automatic-response-prohibited value to indicate that the sending UE does not desire (e.g., prohibits) receiving an automatic response message from the receiving UE.

If it is determined that the sending UE does not desire to receive an automatic response message in response to sending the message to the receiving UE, at 1110, no automatic response message is sent to the sending UE from the receiving UE. If, at 1108, it is determined that the sending UE does not prohibit receiving an automatic response message in response to sending the message to the receiving UE, at 1112, an automatic response message can be sent to the sending UE from the receiving UE. The automatic response message can be a preconfigured message (e.g., "I am unavailable to view your message at this time, but will view and/or respond to your message as soon as I can") desired by the receiving UE (e.g., the automatic response message sender).

It is to be appreciated and understood that components (e.g., UE, AP, communication network, NW message management component, handset message management component, etc.), as described with regard to a particular system or method, can include the same or similar functionality as respective components (e.g., respectively named components or similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  determining whether forwarding, by a second communication device, a copy of a message to a third communication device, the message having been communicated from a first communication device to the second communication device, will result in a cost being incurred based on a subscription that relates to a messaging service, wherein the subscription is associated with a subscriber identity; and
  determining whether to forward, by the second communication device, the copy of the message to the third communication device, wherein the determining whether to forward is based on a message routing rule that is based on preference data corresponding to a preference of the subscriber identity, wherein the preference data indicates whether the cost is to be incurred in connection with the copy of the message being forwarded.

2. The system of claim 1, wherein the determining whether the forwarding of the copy comprises determining whether the forwarding of the copy of the message to the third communication device will result in a defined threshold number of messages being exceeded during a defined subscription time period associated with the subscription, and wherein the defined threshold number of messages being exceeded during the defined subscription time period results in the cost being incurred in connection with the forwarding of the copy of the message to the third communication device.

3. The system of claim 1, wherein the operations further comprise:
 analyzing a second preference of the preference data associated with the second communication device to facilitate the determining whether to forward the copy of the message to the third communication device.

4. The system of claim 3, wherein the operations further comprise:
generating the copy of the message in response to determining that the copy of the message is to be forwarded to the third communication device based on the second preference and the message routing rule.

5. The system of claim 3, wherein the second preference indicates that the copy of the message has been requested to be forwarded to the third communication device during a defined time period.

6. The system of claim 3, wherein the second preference relates to a threshold priority level for the forwarding of the copy of the message, and wherein the operations further comprise:
determining whether the message satisfies the threshold priority level to facilitate the determining whether to forward the copy of the message to the third communication device.

7. The system of claim 3, wherein the second preference indicates that the copy of the message has been requested to be forwarded to the third communication device in response to determining the second communication device is not communicatively connected to a network device.

8. The system of claim 3, wherein the second preference relates to whether the forwarding of the message to the third communication device is permitted based on an identifier associated with the first communication device, and wherein the operations further comprise:
based on the second preference, determining whether the identifier associated with the first communication device is in a set of identifiers for which message forwarding to the third communication device is permitted to facilitate the determining whether to forward the copy of the message to the third communication device.

9. The system of claim 1, wherein the operations further comprise:
analyzing a forwarding indicator associated with the message to facilitate determining whether the forwarding of the copy of the message to the third communication device is prohibited by the first communication device, wherein the determining whether to forward the copy of the message to the third communication device comprises determining whether to forward the copy of the message to the third communication device based on the message routing rule and the forwarding indicator.

10. The system of claim 1, wherein the message is a text message, and the first communication device is a mobile communication device, and wherein the operations further comprise:
receiving information that indicates a specified time for communication of the text message from the first communication device to the second communication device; and
communicating the text message to the second communication device at the specified time.

11. A method, comprising:
determining, by a system comprising a processor, whether transmitting, by a second communication device, a copy of a message to a third communication device, the message having been communicated from a first communication device to the second communication device, will result in a cost being incurred in connection with a subscription that relates to a messaging service, wherein the subscription is associated with a subscriber identity; and
determining, by the system, whether to transmit, by the second communication device, the copy of the message to the third communication device, wherein the determining whether to transmit is based on a message communication rule that relates to a preference of the subscriber identity, wherein the message communication rule indicates whether the cost is to be incurred in connection with the copy of the message being transmitted to the third communication device.

12. The method of claim 11, further comprising:
determining, by the system, that the transmitting the copy of the message to the third communication device will not result in the cost being incurred in connection with the subscription; and
determining, by the system, that the copy of the message is to be transmitted to the third communication device in response to the determining that the transmitting the copy of the message to the third communication device will not result in the cost being incurred, in accordance with the message communication rule.

13. The method of claim 11, further comprising:
determining, by the system, that the transmitting the copy of the message to the third communication device will result in the cost being incurred in connection with the subscription; and
determining, by the system, that the copy of the message is not to be transmitted to the third communication device in response to determining that the transmitting the copy of the message to the third communication device will result in the cost being incurred, in accordance with the message communication rule.

14. The method of claim 11, further comprising:
analyzing, by the system, another preference in connection with the message to facilitate the determining whether to transmit the copy of the message to the third communication device.

15. The method of claim 14, further comprising:
generating, by the system, the copy of the message in response to determining that the copy of the message is to be transmitted to the third communication device based on the other preference and the message communication rule.

16. The method of claim 14, wherein the other preference indicates that the copy of the message is requested to be transmitted to the third communication device during a defined time period.

17. The method of claim 14, wherein the other preference relates to a threshold priority level for the transmitting of the copy of the message, and wherein the method further comprises:
determining, by the system, whether the message satisfies the threshold priority level to facilitate the determining whether to transmit the copy of the message to the third communication device.

18. The method of claim 11, wherein the message is a text message, and the third communication device is a mobile communication device, and wherein the method further comprises:
identifying, by the system, another preference that indicates the copy of the text message is to be delivered to an email message box address associated with the third communication device; and
sending, by the system, the copy of the text message to the email message box address associated with the third communication device based on the other preference.

19. A non-transitory machine-readable storage medium storing executable instructions that, in response to execution, cause a system comprising a processor to perform operations, comprising:

determining whether forwarding, by a second communication device, a copy of a message to a third communication device, the message having been communicated from a first communication device to the second communication device, is to result in a defined threshold number of messages being exceeded during a defined subscription time period, wherein the defined subscription time period is associated with a subscription that relates to a messaging service and is associated with a subscriber identity, and wherein the defined threshold number of messages being exceeded during the defined subscription time period results in a cost being incurred in connection with the forwarding of the copy of the message; and determining whether to forward, by the second communication device, the copy of the message to the third communication device, wherein the determining whether to forward is based on a defined message routing rule that relates to a preference of the subscriber identity, and wherein the preference indicates whether the cost is to be incurred in connection with the copy of the message being forwarded.

20. The non-transitory machine-readable storage medium of claim 19, wherein the operations further comprise:

determining that the forwarding of the copy of the message to the third communication device is not to result in the cost being incurred in connection with the subscription in response to determining that the forwarding of the copy of the message to the third communication device is not to result in the defined threshold number of messages being exceeded during the defined subscription time period; and determining that the copy of the message is to be forwarded to the third communication device in response to the determining that the forwarding of the copy of the message to the third communication device is not to result in the cost being incurred, in accordance with the message routing rule.

\* \* \* \* \*